United States Patent
Suzuki (10) Patent No.: US 7,271,115 B2
(45) Date of Patent: Sep. 18, 2007

(54) DIELECTRIC CERAMIC COMPOSITION AND MONOLITHIC CERAMIC CAPACITOR

(75) Inventor: Shoichiro Suzuki, Yasu (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

(21) Appl. No.: 11/650,423

(22) Filed: Jan. 8, 2007

(65) Prior Publication Data

US 2007/0123413 A1    May 31, 2007

Related U.S. Application Data

(63) Continuation of application No. PCT/JP2005/010721, filed on Jun. 10, 2005.

(30) Foreign Application Priority Data

Jul. 8, 2004  (JP) .............................. 2004-202398
Nov. 15, 2004 (JP) .............................. 2004-331232

(51) Int. Cl.
C04B 35/468    (2006.01)

(52) U.S. Cl. .................. 501/138; 501/139; 361/321.4; 361/321.5

(58) Field of Classification Search ................ 501/138, 501/139; 361/321.4, 321.5
See application file for complete search history.

(56) References Cited

U.S. PATENT DOCUMENTS 6,310,761 B1 * 10/2001 Hori et al. ................ 361/321.2
6,346,497 B1 * 2/2002 Nakamura et al. .......... 501/138
6,522,521 B2 * 2/2003 Mizuno et al. .......... 361/321.4
6,620,754 B2 * 9/2003 Mizuno et al. ............. 501/138
6,620,755 B2 * 9/2003 Saito et al. ................. 501/138
7,160,827 B2 * 1/2007 Banno ........................ 501/138

FOREIGN PATENT DOCUMENTS

| JP | 5-194027 | 8/1993 |
| JP | 2000-103668 | 4/2000 |
| JP | 2001-39765 | 2/2001 |
| JP | 2001-143955 | 5/2001 |
| JP | 2002-50536 | 2/2002 |
| JP | 2003-277136 | 10/2003 |

* cited by examiner

Primary Examiner—Karl Group
(74) Attorney, Agent, or Firm—Dickstein Shapiro LLP (57) ABSTRACT

A dielectric ceramic composition contains a substance represented by general formula $100(Ba_{1-x}Ca_x)_m TiO_3 + aMnO + bCuO + cRO_n$ (wherein the coefficients 100, a, b, and c each represent mols; R represents at least one element selected from the group consisting of Y, La, Ce, Pr, Nd, Sm, Eu, Gd, Tb, Dy, Ho, Er, Tm, Yb and Lu; and n represents a number determined by the valence of the rare-earth element R and is a positive number required for maintaining electroneutrality) and a sintering aid. The dielectric ceramic composition satisfies the relationships $0.990 \leq m \leq 1.050$; $0.01 \leq x \leq 0.20$; $0.5 \leq a \leq 3.5$; $0.1 \leq b \leq 5.0$; and $10 \leq c \leq 20$, and the amount of the sintering aid represented by d in terms of parts by weight per 100 parts by weight of the compound represented by $(Ba_{1-x}Ca_x)_m TiO_3$ satisfies $0.8 \leq d \leq 5.0$. Furthermore, $VO_{3/2}$ may be added to increase the breakdown field.

19 Claims, 1 Drawing Sheet

DIELECTRIC CERAMIC COMPOSITION AND MONOLITHIC CERAMIC CAPACITOR

This is a continuation of application Ser. No. PCT/JP2005/010721 filed Jun. 20, 2005.

TECHNICAL FIELD

The present invention relates to dielectric ceramic compositions and monolithic ceramic capacitors, in particular, to a dielectric ceramic composition and a monolithic ceramic capacitor that exhibits high reliability in operation under high DC voltage or high-frequency and/or high AC voltage.

BACKGROUND ART

Monolithic ceramic capacitors have often been used under low-frequency low AC voltage or DC low voltage. However, with the advancement of electronics, miniaturization of electronic components is progressing rapidly. This has also accelerated an increase in capacity and miniaturization of monolithic ceramic capacitors. Accordingly, the electric field applied between a pair of opposing electrodes of a ceramic capacitor relatively tends to increase. Under these conditions, there is strong demand for high capacity, low loss, improved insulation performance, and improved reliability.

With this regard, Patent Document 1 (Japanese Unexamined Patent Application Publication No. 2000-10366) and Patent Document 2 (Japanese Unexamined Patent Application Publication No. 2002-50536) teach a dielectric ceramic composition and a monolithic ceramic capacitor that can withstand the operation under high-frequency high AC voltage or under high DC voltage.

A dielectric ceramic composition set forth in Patent Document 1 contains 100 parts by weight of main component represented by general formula $ABO_3+aR+bM$ (wherein $ABO_3$ is a general formula representing a barium titanate solid solution; R represents at least one oxide selected from the group consisting of La, Ce, Pr, Nd, Sm, Eu, Gd, Tb, Dy, Ho, Er, Tm, Yb, and Lu; and M represents at least one oxide selected from the group consisting of Mn, Ni, Mg, Fe, Al, Cr, and Zn), A/B (molar ratio), a, and b satisfying $0.950 \leq A/B \leq 1.050$, $0.12 < a \leq 0.30$, and $0.04 \leq b \leq 0.30$; and 0.8 to 8.0 parts by weight of a sintering aid. This dielectric ceramic composition may further contain $X(Zr,Hf)O_3$ (wherein X is at least one selected from Ba, Sr, and Ca) in an amount of 0.35 mol or less per mole of the barium titanate solid solution and/or D (wherein D is at least one oxide selected from the group consisting of V, Nb, Ta, Mo, W, Y, and Sc) in an amount of 0.02 mol or less per mole of the barium titanate solid solution. The dielectric ceramic composition exhibits a relative dielectric constant of 200 or more, low loss under high frequency and/or high AC voltage, and high specific insulation resistance under high field intensity, satisfies B characteristic and X7R characteristic, and has a long mean time to fail in high-temperature loading test when it is sintered at 1,300° C. or less.

A reduction-resistant dielectric ceramic set forth in Patent Document 2 includes 100 parts by weight of a main component represented by $ABO_3+aR+bM$ (wherein $ABO_3$ is a general formula representing a barium titanate solid solution; R represents at least one oxide selected from the group consisting of La, Ce, Pr, Nd, Sm, Eu, Gd, Tb, Dy, Ho, Er, Tm, Yb, and Lu; and M represents at least one oxide selected from the group consisting of Mn, Ni, Mg, Fe, Al, Cr, and Zn), A/B (molar ratio), a, and b satisfying $1.000 \leq A/B \leq 1.035$, $0.005 \leq a \leq 0.12$, and $0.005 \leq b \leq 0.12$; and 0.2 to 4.0 parts by weight of a sintering aid. This dielectric ceramic composition may further contain $X(Zr,Hf)O_3$ (wherein X is at least one selected from Ba, Sr, and Ca) in an amount of 0.20 mol or less per mole of the barium titanate solid solution and/or D (wherein D is at least one oxide selected from the group consisting of V, Nb, Ta, Mo, W, Y, Sc, P, Al, and Fe) in an amount of 0.02 mol or less per mole of the barium titanate solid solution. In this dielectric ceramic composition, the crystal axis ratio c/a determined by X-ray diffraction in the temperature range of −25° C. or more satisfies $1.000 \leq c/a \leq 1.003$ and the local maxima of the relative dielectric constant against temperature change during application of an AC field of 2 Vrms/mm or less at a frequency of 1 kHz is observed at a temperature less than −25° C. The dielectric ceramic composition exhibits low loss and low heat generation under high-frequency and/or high AC voltage and exhibits stable insulating resistance when AC or DC voltage is applied.

DISCLOSURE OF INVENTION

Problems to be Solved by the Invention

The dielectric ceramic compositions disclosed in Patent Documents 1 and 2 have high reliability under high frequency and/or high AC voltage or under high DC voltage. However, demand for smaller, larger-capacity electronic components such as monolithic ceramic capacitors is also expected to grow stronger in the future, and the frequency and intensity of the applied field during operation is expected to further increase in the future. Therefore, improving the characteristics and reliability under these conditions of operation has become an urgent task.

Furthermore, the working voltage approaches toward the breakdown voltage (referred to as "BDV" hereinafter)as the thickness of the ceramic layer decreases. Therefore, another important objective is to increase the electric field at which the ceramic material undergoes breakdown.

The present invention is made based on the circumstances described above. An object thereof is to provide a dielectric ceramic composition that generates low heat during operation under high-frequency and/or high AC voltage or under high DC voltage, that exhibits relative dielectric constant and specific insulation resistance comparable with those of existing art, and that has high reliability compatible with future trends for further miniaturization and an increase in capacity, and a monolithic ceramic capacitor composed of the dielectric ceramic composition.

In addition to these advantages, the present invention aims to provide a monolithic ceramic capacitor having a higher breakdown field and higher reliability.

Means for Solving the Problems

A dielectric ceramic composition of the present invention includes a substance represented by general formula $100(Ba_{1-x}Ca_x)_mTiO_3+aMnO+bCuO+cRO_n$ (wherein the coefficients 100, a, b, and c each represent mols; R represents at least one element selected from the group consisting of Y, La, Ce, Pr, Nd, Sm, Eu, Gd, Tb, Dy, Ho, Er, Tm, Yb and Lu; and n represents a number determined by the valence of the rare-earth element R and is a positive number required for maintaining electroneutrality) and a sintering aid, in which the dielectric ceramic composition satisfies the relationships:

$0.990 \leq m \leq 1.050$, $0.01 \leq x \leq 0.20$, $0.5 \leq a \leq 3.5$, $0.1 \leq b \leq 5.0$, and $10 \leq c \leq 20$, and the amount of the sintering aid represented by d in terms of parts by weight satisfies $0.8 \leq d \leq 5.0$ with respect to 100 parts by weight of the compound represented by $(Ba_{1-x}Ca_x)_m TiO_3$.

As in a second dielectric ceramic composition, the dielectric ceramic composition preferably contains 7.0 mol or less of MO (wherein M represents at least one element selected from the group consisting of Mg, Ni and Zn) per 100 mol of the compound represented by $(Ba_{1-x}Ca_x)_m TiO_3$.

As in a third dielectric ceramic composition, the foregoing dielectric ceramic compositions preferably contains 15 mol or less of $X(Zr,Hf)O_3$ (wherein X is at least one element selected from the group consisting of Ba, Sr and Ca) per 100 mol of the compound represented by $(Ba_{1-x}Ca_x)_m TiO_3$.

A fourth dielectric ceramic composition is any of the above dielectric ceramic compositions containing $SiO_2$ as the sintering aid.

The present invention is also directed to a monolithic ceramic capacitor incorporating the dielectric ceramic composition described above.

A monolithic ceramic capacitor of the present invention includes a plurality of dielectric ceramic layers laminated on one another, an internal electrode disposed between the dielectric ceramic layers, and an external electrode electrically connected to the internal electrode, in which the dielectric ceramic layers include any of the foregoing dielectric ceramic compositions.

Such a monolithic ceramic capacitor preferably has the internal electrode including a conductive material containing Ni or a Ni alloy or Cu or Cu alloy as a main component.

When dielectric ceramic composition of the present invention contains a substance represented by general formula $100(Ba_{1-x}Ca_x)_m TiO_3 + aMnO + bCuO + cVO_{3/2} + dRO_n$ (wherein coefficients 100, a, b, c, and d each represent moles; R is at least one element selected from the group consisting of Y, La, Ce, Pr, Nd, Sm, Eu, Gd, Tb, Dy, Ho, Er, Tm, Yb and Lu; and n represents a number determined by the valence of R and is a positive number required for maintaining electroneutrality) and a sintering aid, in which the dielectric ceramic composition satisfies the relationships $0.990 \leq m \leq 1.050$, $0.01 \leq x \leq 0.20$, $0.5 \leq a \leq 3.5$, $0.1 \leq b \leq 5.0$, $0.1 \leq c \leq 3.0$, and $8 \leq d \leq 20$, and in which the amount of the sintering aid represented by e in terms of parts by weight satisfies $0.8 \leq e \leq 5.0$ with respect to 100 parts by weight of the compound represented by $(Ba_{1-x}Ca_x)_m TiO_3$.

Another dielectric ceramic composition preferably contains 7.0 mol or less of MO (wherein M represents at least one element selected from the group consisting of Mg, Ni and Zn) per 100 mol of the compound represented by $(Ba_{1-x}Ca_x)_m TiO_3$.

Yet another dielectric ceramic compositions preferably contain 15 mol or less of $X(Zr,Hf)O_3$ (wherein X is at least one element selected from the group consisting of Ba, Sr and Ca) per 100 mol of the compound represented by $(Ba_{1-x}Ca_x)_m TiO_3$.

The dielectric ceramic composition can preferably contain $SiO_2$ as the sintering aid.

The invention is also directed to a monolithic capacitor containing the dielectric ceramic composition described above.

A monolithic ceramic capacitor of the present invention includes a plurality of dielectric ceramic layers laminated on one another, an internal electrode disposed between dielectric ceramic layers, and an external electrode electrically connected to the internal electrode, in which the dielectric ceramic layers include any of the foregoing dielectric ceramic compositions.

The monolithic ceramic capacitor preferably has the internal electrode including a conductive material containing Ni or a Ni alloy or Cu or Cu alloy as a main component.

Advantages

Even when miniaturization and an increase in capacity progress further in the future, the present monolithic ceramic capacitor exhibits low heat generation in operation under high DC voltage or high-frequency and/or high AC voltage, and a specific insulation resistance comparable to those of existing art, and high reliability can be provided.

In addition to the advantages described above, a monolithic ceramic capacitor with a higher breakdown field and higher reliability can be provided.

| Reference Numerals | |
|---|---|
| 1, 21: | monolithic ceramic capacitor |
| 2, 22: | dielectric ceramic layer |
| 3, 23: | laminate |
| 4, 5, 24, 25: | first and second external electrodes |
| 6, 7, 26, 27: | first plating layer |
| 8, 9, 28, 29: | first and second internal electrodes |
| 10, 11, 30, 31: | second plating layer |

BEST MODE FOR CARRYING OUT THE INVENTION

First Embodiment

First, the composition of a dielectric ceramic composition according to the present invention is described.

The dielectric ceramic composition of the present invention contains a main component represented by general formula $100(Ba_{1-x}Ca_x)_m TiO_3 + aMnO + bCuO + cRO_n$ and d parts by weight of a sintering aid, wherein m, x, a, b, c and d satisfy the relationships $0.990 \leq m \leq 1.050$, $0.01 \leq x \leq 0.20$, $0.5 \leq a \leq 3.5$, $0.1 \leq b \leq 5.0$, $10 \leq c \leq 20$, and $0.8 \leq d \leq 5.0$.

That is, by newly adding CuO to a system in which a rare-earth oxide $RO_n$ and MnO are added to the main component $(BaCa)TiO_3$ of the dielectric ceramic composition, a dielectric ceramic composition that suppresses heat generation during operation under high-frequency and/or high AC voltage or under high DC voltage, that exhibits a relative dielectric constant and a specific insulation resistance comparable to those of existing art, and that has high reliability can be obtained, and can be used as a dielectric ceramic material for a monolithic ceramic capacitor further miniaturization and having an increase in capacity which are desired in the future. This is due to a synergistic effect of a relatively large amount of rare-earth oxide $RO_n$, and 10 to 20 mol per 100 mol of calcium barium titanate $(Ba_{1-x}Ca_x)_m TiO_3$, which is the main component, and the newly added CuO.

A substantial part of the rare-earth oxide $RO_n$ dissolves into part of $(Ba_{1-x}Ca_x)_mTiO_3$ main phase particles such that each particle is divided into a core substantially free of $RO_n$ and a shell containing a solid solution of $RO_n$. Because of such a particle structure, the phase transfer temperature of the ceramic of the present invention from tetragonal to cubic does not exceed room temperature, e.g., the temperature may be about −80° C. Thus, at room temperature, the crystal structure is cubic or close to cubic. It is presumed that the effect of suppressing generation of heat in operation under high DC voltage or high-frequency and/or high AC voltage is derived from this crystal structure.

In the main component $(Ba_{1-x}Ca_x)_mTiO_3$ of the dielectric ceramic composition, the molar ratio m of (Ba+Ca) to Ti satisfies $0.990 \leq m \leq 1.050$. At an m less than 0.990, the specific insulation resistance ρ is less than $10^{11}$ Ω·m, which is low. At m exceeding 1.050, the mean time to fail (MTTF) in high-temperature loading test (170° C., DC field intensity: 40 kV/mm, dielectric thickness: 10 μm) is less than 150 hours, which is short.

The Ca content x in calcium barium titanate $(Ba_{1-x}Ca_x)_mTiO_3$ satisfies $0.01 \leq x \leq 0.20$ in terms of mols. When x is less than 0.01, the MTTF in high-temperature loading test is less than 150 hours, which is short. At x exceeding 0.20, the relative dielectric constant decreases to less than 300.

The MnO content a relative to $100(Ba_{1-x}Ca_x)_mTiO_3$ satisfies $0.5 \leq a \leq 3.5$ in terms of mols. If a is less than 0.5 or more than 3.5, the specific insulation resistance ρ becomes lower than $10^{11}$ Ω·m.

The CuO content b relative to $100(Ba_{1-x}Ca_x)_mTiO_3$ satisfies $0.1 \leq b \leq 5.0$ in terms of mols. If b is less than 0.1, the MTTF in the high-temperature loading test becomes shorter than 150 hours. At b exceeding 5.0, the specific insulation resistance ρ becomes lower than $10^{11}$ Ω·m.

The $RO_n$ content c relative to $100(Ba_{1-x}Ca_x)_mTiO_3$ satisfies $10 \leq c \leq 20$ in terms of mols. If c is less than 10, the MTTF in the high-temperature loading test becomes shorter than 100 hours. At c exceeding 20, the relative dielectric constant becomes lower than 300. R may be at least one selected from the group consisting of Y, La, Ce, Pr, Nd, Sm, Eu, Gd, Tb, Dy, Ho, Er, Tm, Yb and Lu, or may be a compound containing a suitable combination of two or more elements. Furthermore, n in $RO_n$ is a number determined by the valence of the rare-earth element R and represents a positive number required for maintaining electroneutrality. For example, when R is La, n=1.5, and when R is Ce, n=2.

The dielectric ceramic composition of the present invention contains d parts by weight with respect to 100 parts by weight of the main component of a sintering aid as an auxiliary component, in which the relationship $0.8 \leq d \leq 5.0$ is satisfied. When the content d of sintering aid is less than 0.8, stable sintering becomes difficult. When d exceeds 5.0, the MTTF in the high-temperature loading test becomes as short as less than 150 hours. An existing sintering aid may be used as the sintering aid without particular limitation. In the present invention, $SiO_2$ is preferably used as the sintering aid.

Moreover, the dielectric ceramic composition of the present invention preferably contains, as an additional component in the main component, 7.0 mol or less of MO per 100 mol of $(Ba_{1-x}Ca_x)_mTiO_3$. By adding MO to the main component, the relative dielectric constant and reliability under high-temperature loading can be increased compared to that when no MO is added. When the MO content exceeds 7.0 mol, the relative dielectric constant becomes lower than when no MO is added, which is not preferable. Here, M represents at least one element selected from the group consisting of Mg, Ni and Zn. M may be one element or two or more elements suitably selected from these elements.

The dielectric ceramic composition of the present invention may contain, as an additional component in the main component, 15 mol or less of $X(Zr,Hf)O_3$ per 100 mol of $(Ba_{1-x}Ca_x)_mTiO_3$. When $X(Zr,Hf)O_3$ is added to the main component, a higher relative dielectric constant and high-temperature loading reliability can be attained compared with when no $X(Zr,Hf)O_3$ is added. If $X(Zr,Hf)O_3$ exceeds 15 mol, the relative dielectric constant disadvantageously decreases compared to that when no $X(Zr,Hf)O_3$ is added. Here, X denotes at least one element selected from the group consisting of Ba, Sr and Ca. Although the ratio of Hf to Zr in $X(Zr,Hf)O_3$ is not particularly limited, it is preferably 30 mol % or less from the standpoint of stabilizing the sinterability.

Next, a method of making the dielectric ceramic composition of the present invention is described.

The method for making a $(Ba_{1-x}Ca_x)_mTiO_3$ material powder for the dielectric ceramic composition is not particularly limited as long as the ceramic composition represented by the above-described formula can be made. For example, a dry synthetic method of calcining a mixture of starting materials and then conducting solid-phase reaction may be employed. Alternatively, a wet synthetic method such as a hydrothermal synthetic method, a hydrolytic method or a sol-gel method may be employed.

The starting materials for $RO_n$, MnO, CuO and $SiO_2$, which are the components added to the $(Ba_{1-x}Ca_x)_mTiO_3$ material powder, i.e., the main component, are not limited to oxide powders as long as they produce the dielectric ceramic composition of the present invention. For example, a carboxide powder, a solution of alkoxide or organic metal, or the like may be used as the starting material.

By sintering the above-described material powder, the dielectric ceramic composition of the present invention can be obtained.

Next, the structure of a monolithic ceramic capacitor of the present invention incorporating the dielectric ceramic composition of the present invention and a method for making the monolithic ceramic capacitor are described.

Figure 1:
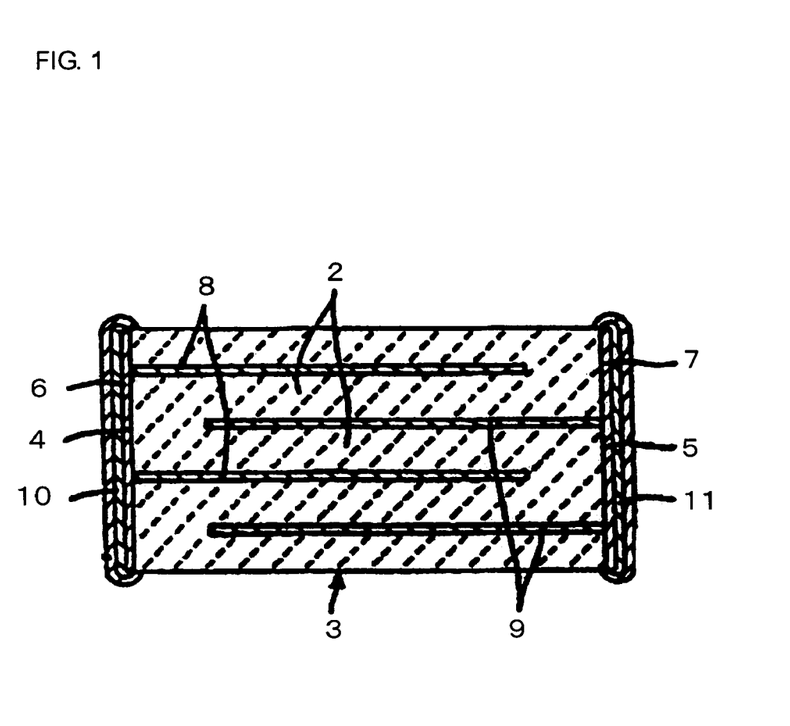
FIG. 1 is a cross-sectional view showing an embodiment (first embodiment) of a monolithic ceramic capacitor of the present invention.

In the description below, the subject invention is explained based on the embodiment shown in FIG. 1. FIG. 1 is a schematic cross-sectional view showing a monolithic ceramic capacitor according to this embodiment of the present invention.

As shown in FIG. 1, a monolithic ceramic capacitor 1 of this embodiment includes a laminate 3 including laminated dielectric ceramic layers 2 and first and second internal electrodes 8 and 9 interposed between the dielectric ceramic layers 2. A first external electrode 4 and a second external electrode 5 are formed on two end surfaces of the laminate 3, respectively, and these external electrodes are electrically connected to the first and second internal electrodes 8 and 9.

Each first internal electrode 8 in FIG. 1, extends from one end (left end in the drawing) of the dielectric ceramic layer 2 to near the other end (right end) of the dielectric ceramic layer 2. Each second internal electrode 9 extends from the right end of the dielectric ceramic layer to near the left end. The first and second internal electrodes 8 and 9 are composed of a conductive metal containing, for example, Ni as a main component.

The first external electrode in FIG. 1, 4 is electrically connected to the first internal electrodes 8 in the laminate 3, and the second external electrode 5 is electrically connected to the second internal electrodes 9 in the laminate 3. The first and second external electrodes 4 and 5 are composed of a conductive metal containing Cu or Ag as a main component, for example. The surfaces of the first and second external electrodes 4 and 5 are coated with first plating layers 6 and 7 and then with second plating layers 10 and 11.

Since the dielectric ceramic composition of the present invention can be sintered in a reducing atmosphere, the internal electrodes of the capacitor are preferably composed of a conductive material including Ni or an alloy thereof, or Cu or an alloy thereof. In this manner, internal electrodes can be made at low cost.

Accordingly, the monolithic ceramic capacitor incorporating the dielectric ceramic composition of the present invention has a relative dielectric constant or 300 or more and a specific insulation resistance of $10^{11}$ Ω·m or more, and generates smaller heat, i.e., has a dielectric loss of 0.8% or less during application of high-frequency high AC voltage (10 kVp-p/mm at 300 kHz). It also has a MTTF in a high temperature-loading test (170° C., DC field intensity: 40 kV/mm, dielectric thickness: 10 μm) of 150 hours or more, thereby exhibiting high reliability.

EXAMPLE 1-1

In this example, a monolithic ceramic capacitor 1 shown in FIG. 1 was made.

First, highly pure powders of $BaCO_3$, $CaCO_3$ and $TiO_2$ were prepared as the starting materials for the main component, $(Ba_{1-x}Ca_x)_mTiO_3$, and blended so that the modified Ca content x and the molar ratio m of (Ba+Ca) to Ti were as shown in Table 1.

The prepared powder was wet-mixed in a ball mill. After the powder was homogeneously dispersed, the powder was dried to obtain adjusted powder.

The adjusted powder was calcined at a temperature of 1,000° C. or more to obtain a $(Ba_{1-x}Ca_x)_mTiO_3$ powder that satisfies x and m in Table 1.

As the starting materials for the auxiliary component, powders of $MnCO_3$, $CuO$, $SiO_2$, $Y_2O_3$, $La_2O_3$, $CeO_2$, $Pr_5O_{11}$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$ were prepared. The starting materials for the auxiliary component were blended with the $(Ba_{1-x}Ca_x)_mTiO_3$ powder so that the compositions having x, m, a, b, c and d shown in Table 1 below were obtained. In this embodiment, $SiO_2$ was used as the sintering aid.

Next, the resulting prepared powder was wet-mixed in a ball mill. After the powder was homogeneously dispersed, the powder was dried to obtain a material powder for a dielectric ceramic composition.

A polyvinyl butyral-based binder and an organic solvent such as ethanol were added to the material powder, and the resulting mixture was wet-mixed in a ball mill to prepare a slurry of the ceramic material powder.

The ceramic slurry was formed into a sheet by a doctor blade method to prepare a ceramic green sheet having a thickness of 14 μm, and then a conductive paste containing Ni as a main component was applied on the ceramic green sheet by screen-printing so as to form a conductive paste film for an internal electrode.

Subsequently, a green laminate was prepared by laminating ceramic green sheets such that the sides at which the conductive paste film are extracted are arranged alternately, as shown in FIG. 1. The green laminate was heated to a temperature of 350° C. in a nitrogen atmosphere to burn off the binder, and then baked at a temperature shown in Table 2 for 2 hours in a reducing atmosphere containing a mixed gas of $H_2$—$N_2$—$H_2O$ at an oxygen partial pressure of $10^{-9}$ to $10^{-12}$ MPa so as to obtain a laminate 3.

A Ag paste containing a $B_2O_3$—$SiO_2$—BaO-based glass frit was prepared and applied onto the two end surfaces at which the internal electrodes 8 and 9 of the laminate 3 were exposed. Next, the Ag paste was baked at a temperature of 600° C. in a $N_2$ atmosphere so as to form the first and second external electrodes 4 and 5, which were electrically connected to the first and second internal electrodes 8 and 9, on the two end surfaces of the laminate 3. Subsequently, the surfaces of the first and second external electrodes 4 and 5 were subjected to two-step plating to form the first plating layers 6 and 7 and the second plating layers 10 and 11 to obtain a monolithic ceramic capacitor 1.

The external dimensions of the monolithic ceramic capacitor 1 obtained thereby were 3.2 mm in width, 4.5 mm in length, and 0.5 mm in thickness. The thickness of the dielectric ceramic layer interposed between the adjacent internal electrodes was 10 μm. The total number of the dielectric ceramic layers effective for obtaining capacitance was five, and the area of the opposing electrode per layer was $2.5 \times 10^{-6}$ m$^2$. Sample Nos. 1 to 51 of monolithic ceramic capacitors obtained thereby were analyzed to evaluate electrical characteristics. The results are shown in Table 2.

In Tables 1 and 2, asterisked samples are outside the range of the present invention.

The methods for evaluating electrical characteristics of the monolithic ceramic capacitors and the results of the evaluation will now be described.

A. Relative Dielectric Constant ($\epsilon r$) and Dielectric Loss (tan δ)

Using an automatic bridge-type meter, a signal voltage of 50 Vrms/mm (1 kHz) was applied to each of Sample Nos. 1 to 51 to measure the capacitance (C) and dielectric loss (tan δ). The relative dielectric constant ($\epsilon r$) was calculated from the observed value of capacitance based on the structure of each monolithic ceramic capacitor. The results are shown in Table 2.

B. Specific Insulation Resistance (ρ)

Using an insulating-resistance tester, a DC voltage of 300 V was applied to each of Sample Nos. 1 to 51 for 1 minute to measure the insulating resistance at 25° C., and the specific insulation resistance (ρ) was calculated therefrom. The results are shown in Table 2.

C. Mean Time to Fail (MTTF)

As a high-temperature loading test, a DC voltage of 400 V was applied to 20 specimens of each of Sample Nos. 1 to 51 at 170° C. to measure the change over time in insulating resistance. In the high-temperature loading test, each sample was assumed to have failed when its insulating resistance became $10^6$ Ω or less, and the mean time to fail of each sample was determined. The results are shown in Table 2.

D. Dielectric Loss (Tan δ) During Application of High-Frequency AC Voltage

In order to evaluate heat generation during application of high frequency, a signal voltage of 10 kVp-p/mm (300 kHz) was applied to each of Sample Nos. 1 to 51 to measure the dielectric loss (tan δ). The results are shown in Table 2.

TABLE 1

| Sample No. | m | x | R | a | b | c | d |
|---|---|---|---|---|---|---|---|
| *1 | 0.980 | 0.06 | Gd | 1.0 | 1.0 | 12 | 1.25 |
| 2 | 0.990 | 0.06 | Gd | 1.0 | 1.0 | 12 | 1.25 |
| 3 | 1.000 | 0.06 | Gd | 1.0 | 1.0 | 12 | 1.25 |
| 4 | 1.010 | 0.06 | Gd | 1.0 | 1.0 | 12 | 1.25 |
| 5 | 1.030 | 0.06 | Gd | 1.0 | 1.0 | 12 | 1.25 |
| 6 | 1.050 | 0.06 | Gd | 1.0 | 1.0 | 12 | 1.25 |
| *7 | 1.060 | 0.06 | Gd | 1.0 | 1.0 | 12 | 1.25 |
| *8 | 1.010 | 0.00 | Gd | 1.0 | 1.0 | 12 | 1.25 |
| 9 | 1.010 | 0.01 | Gd | 1.0 | 1.0 | 12 | 1.25 |
| 10 | 1.010 | 0.10 | Gd | 1.0 | 1.0 | 12 | 1.25 |
| 11 | 1.010 | 0.15 | Gd | 1.0 | 1.0 | 12 | 1.25 |
| 12 | 1.010 | 0.20 | Gd | 1.0 | 1.0 | 12 | 1.25 |
| *13 | 1.010 | 0.25 | Gd | 1.0 | 1.0 | 12 | 1.25 |
| *14 | 1.010 | 0.06 | Gd | 0.0 | 1.0 | 12 | 1.25 |
| *15 | 1.010 | 0.06 | Gd | 0.2 | 1.0 | 12 | 1.25 |
| 16 | 1.010 | 0.06 | Gd | 0.5 | 1.0 | 12 | 1.25 |
| 17 | 1.010 | 0.06 | Gd | 2.0 | 1.0 | 12 | 1.25 |
| 18 | 1.010 | 0.06 | Gd | 3.5 | 1.0 | 12 | 1.25 |
| *19 | 1.010 | 0.06 | Gd | 4.0 | 1.0 | 12 | 1.25 |
| *20 | 1.010 | 0.06 | Gd | 1.0 | 0.0 | 12 | 1.25 |
| 21 | 1.010 | 0.06 | Gd | 1.0 | 0.1 | 12 | 1.25 |
| 22 | 1.010 | 0.06 | Gd | 1.0 | 0.5 | 12 | 1.25 |
| 23 | 1.010 | 0.06 | Gd | 1.0 | 2.0 | 12 | 1.25 |
| 24 | 1.010 | 0.06 | Gd | 1.0 | 5.0 | 12 | 1.25 |
| *25 | 1.010 | 0.06 | Gd | 1.0 | 6.0 | 12 | 1.25 |
| *26 | 1.010 | 0.06 | Gd | 1.0 | 1.0 | 9 | 1.25 |
| 27 | 1.010 | 0.06 | Gd | 1.0 | 1.0 | 10 | 1.25 |
| 28 | 1.010 | 0.06 | Gd | 1.0 | 1.0 | 15 | 1.25 |
| 29 | 1.010 | 0.06 | Gd | 1.0 | 1.0 | 18 | 1.25 |
| 30 | 1.010 | 0.06 | Gd | 1.0 | 1.0 | 20 | 1.25 |
| *31 | 1.010 | 0.06 | Gd | 1.0 | 1.0 | 22 | 1.25 |
| *32 | 1.010 | 0.06 | Gd | 1.0 | 1.0 | 12 | 0.60 |
| 33 | 1.010 | 0.06 | Gd | 1.0 | 1.0 | 12 | 0.80 |
| 34 | 1.010 | 0.06 | Gd | 1.0 | 1.0 | 12 | 2.00 |
| 35 | 1.010 | 0.06 | Gd | 1.0 | 1.0 | 12 | 3.00 |
| 36 | 1.010 | 0.06 | Gd | 1.0 | 1.0 | 12 | 5.00 |
| *37 | 1.010 | 0.06 | Gd | 1.0 | 1.0 | 12 | 6.00 |
| 38 | 1.010 | 0.06 | Y | 1.0 | 1.0 | 12 | 1.25 |
| 39 | 1.010 | 0.06 | La | 1.0 | 1.0 | 12 | 1.25 |
| 40 | 1.010 | 0.06 | Ce | 1.0 | 1.0 | 12 | 1.25 |
| 41 | 1.010 | 0.06 | Pr | 1.0 | 1.0 | 12 | 1.25 |
| 42 | 1.010 | 0.06 | Nd | 1.0 | 1.0 | 12 | 1.25 |
| 43 | 1.010 | 0.06 | Sm | 1.0 | 1.0 | 12 | 1.25 |
| 44 | 1.010 | 0.06 | Eu | 1.0 | 1.0 | 12 | 1.25 |
| 45 | 1.010 | 0.06 | Tb | 1.0 | 1.0 | 12 | 1.25 |
| 46 | 1.010 | 0.06 | Dy | 1.0 | 1.0 | 12 | 1.25 |
| 47 | 1.010 | 0.06 | Ho | 1.0 | 1.0 | 12 | 1.25 |
| 48 | 1.010 | 0.06 | Er | 1.0 | 1.0 | 12 | 1.25 |
| 49 | 1.010 | 0.06 | Tm | 1.0 | 1.0 | 12 | 1.25 |
| 50 | 1.010 | 0.06 | Yb | 1.0 | 1.0 | 12 | 1.25 |
| 51 | 1.010 | 0.06 | Lu | 1.0 | 1.0 | 12 | 1.25 |

TABLE 2

| Sample No. | Baking Temperature (° C.) | $\epsilon r$ | tan δ [%] (1 kHz) | ρ [Ωm] | MTTF[hr] | tan δ [%] (300 kHz) |
|---|---|---|---|---|---|---|
| *1 | 1200 | 620 | 0.4 | $6.2 * 10^{10}$ | 120 | 0.8 |
| 2 | 1200 | 620 | 0.4 | $8.3 * 10^{11}$ | 150 | 0.8 |
| 3 | 1200 | 620 | 0.4 | $7.2 * 10^{11}$ | 155 | 0.7 |
| 4 | 1225 | 600 | 0.3 | $8.3 * 10^{11}$ | 160 | 0.6 |
| 5 | 1250 | 580 | 0.5 | $6.5 * 10^{11}$ | 160 | 0.7 |
| 6 | 1275 | 550 | 0.5 | $6.2 * 10^{11}$ | 150 | 0.6 |
| *7 | 1300 | 530 | 0.5 | $4.4 * 10^{11}$ | 130 | 0.6 |
| *8 | 1225 | 600 | 0.2 | $7.2 * 10^{11}$ | 130 | 0.8 |
| 9 | 1200 | 620 | 0.3 | $7.6 * 10^{11}$ | 150 | 0.8 |
| 10 | 1200 | 580 | 0.4 | $8.9 * 10^{11}$ | 160 | 0.6 |
| 11 | 1200 | 550 | 0.3 | $9.2 * 10^{11}$ | 170 | 0.6 |
| 12 | 1175 | 400 | 0.5 | $8.8 * 10^{11}$ | 160 | 0.7 |
| *13 | 1175 | 280 | 0.5 | $4.2 * 10^{12}$ | 150 | 0.7 |
| *14 | 1225 | — | — | $5.2 * 10^{7}$ | — | — |
| *15 | 1200 | 610 | 0.4 | $7.6 * 10^{10}$ | 65 | 0.8 |
| 16 | 1200 | 600 | 0.4 | $4.0 * 10^{11}$ | 150 | 0.8 |
| 17 | 1200 | 580 | 0.3 | $5.1 * 10^{11}$ | 160 | 0.6 |
| 18 | 1175 | 570 | 0.5 | $5.8 * 10^{11}$ | 160 | 0.8 |
| *19 | 1175 | 550 | 0.5 | $4.2 * 10^{10}$ | 130 | 0.8 |
| *20 | 1200 | 610 | 0.3 | $8.6 * 10^{11}$ | 90 | 0.6 |
| 21 | 1200 | 600 | 0.3 | $6.0 * 10^{11}$ | 150 | 0.6 |
| 22 | 1200 | 580 | 0.3 | $5.9 * 10^{11}$ | 155 | 0.6 |
| 23 | 1175 | 570 | 0.5 | $4.8 * 10^{11}$ | 160 | 0.7 |
| 24 | 1175 | 570 | 0.5 | $4.2 * 10^{11}$ | 150 | 0.7 |
| *25 | 1175 | 570 | 0.5 | $3.1 * 10^{10}$ | 90 | 0.7 |
| *26 | 1150 | 800 | 0.7 | $6.9 * 10^{11}$ | 120 | 1.2 |
| 27 | 1175 | 730 | 0.4 | $5.1 * 10^{11}$ | 150 | 0.6 |
| 28 | 1225 | 550 | 0.3 | $4.3 * 10^{11}$ | 160 | 0.6 |
| 29 | 1250 | 480 | 0.3 | $4.2 * 10^{11}$ | 170 | 0.6 |
| 30 | 1275 | 350 | 0.2 | $6.1 * 10^{11}$ | 180 | 0.6 |
| 31 | 1300 | 270 | 0.1 | $5.3 * 10^{11}$ | 200 | 0.6 |

TABLE 2-continued

| Sample No. | Baking Temperature (° C.) | εr | tan δ [%] (1 kHz) | ρ [Ωm] | MTTF[hr] | tan δ [%] (300 kHz) |
|---|---|---|---|---|---|---|
| *32 | Insufficient Sintering | — | — | — | — | — |
| 33 | 1250 | 540 | 0.5 | $3.3 * 10^{12}$ | 150 | 0.6 |
| 34 | 1150 | 600 | 0.4 | $4.3 * 10^{12}$ | 160 | 0.7 |
| 35 | 1125 | 580 | 0.4 | $7.4 * 10^{11}$ | 165 | 0.7 |
| 36 | 1100 | 540 | 0.2 | $7.7 * 10^{11}$ | 150 | 0.5 |
| *37 | 1100 | 500 | 0.1 | $8.3 * 10^{11}$ | 120 | 0.5 |
| 38 | 1225 | 570 | 0.2 | $7.4 * 10^{11}$ | 150 | 0.5 |
| 39 | 1150 | 580 | 0.2 | $7.7 * 10^{11}$ | 150 | 0.5 |
| 40 | 1150 | 560 | 0.3 | $8.3 * 10^{11}$ | 150 | 0.6 |
| 41 | 1150 | 550 | 0.3 | $7.4 * 10^{11}$ | 160 | 0.6 |
| 42 | 1150 | 600 | 0.1 | $7.7 * 10^{11}$ | 160 | 0.5 |
| 43 | 1175 | 580 | 0.3 | $8.3 * 10^{11}$ | 155 | 0.5 |
| 44 | 1175 | 590 | 0.2 | $7.4 * 10^{11}$ | 155 | 0.5 |
| 45 | 1200 | 570 | 0.2 | $7.7 * 10^{11}$ | 150 | 0.7 |
| 46 | 1200 | 550 | 0.4 | $8.3 * 10^{11}$ | 170 | 0.8 |
| 47 | 1225 | 600 | 0.3 | $7.4 * 10^{11}$ | 170 | 0.8 |
| 48 | 1225 | 590 | 0.3 | $7.7 * 10^{11}$ | 160 | 0.7 |
| 49 | 1225 | 590 | 0.2 | $8.3 * 10^{11}$ | 155 | 0.7 |
| 50 | 1250 | 600 | 0.3 | $7.4 * 10^{11}$ | 155 | 0.6 |
| 51 | 1250 | 580 | 0.4 | $7.7 * 10^{11}$ | 155 | 0.6 |

The results in Table 2 show that among Sample Nos. 1 to 7 for evaluating the effect of the molar ratio m of (Ba+Ca) to Ti in $(Ba_{1-x}Ca_x)_mTiO_3$, Sample Nos. 2 to 6 within the range of the present invention ($0.990 \leq m \leq 1.050$) exhibited a dielectric loss of 0.5% or less at 50 Vrms/mm (1 kHz) and a specific insulation resistance of $10^{11}$ Ωm or more while retaining a relative dielectric constant of 300 or more. The MTTF in the high-temperature loading test (170° C., DC field intensity: 40 kV/mm) was 150 hours or more, thereby showing high reliability. The dielectric loss during application of high-frequency AC current of 10 kVp-p/mm at 300 kHz was 0.8% or less, i.e., the heat generation was small. In contrast, among Sample Nos. 1 and 7 which are outside the range of the present invention, Sample No. 1 with m of less than 0.990 exhibited a specific insulation resistance of $6.2 \times 10^{10}$ Ωm, which was lower than $10^{11}$ Ωm. Sample No. 7 with m exceeding 1.050 exhibited a MTTF of 130 hours in high-temperature loading test, which was shorter than 150 hours.

Among Sample Nos. 8 to 13, Sample Nos. 9 to 12 with a modified Ca content x within the range of the present invention ($0.01 \leq x \leq 0.20$) all satisfied the above-described characteristics. In contrast, among samples outside the range of the present invention, Sample No. 8 with an modified Ca content x of less than 0.01 exhibited a MTTF of 130 hours, which was shorter than 150 hours, and Sample No. 13 with x exceeding 0.20 exhibited a relative dielectric constant of 280, which was lower than 300.

The results in Table 2 show that among Sample Nos. 14 to 19 for evaluating the effect of the MnO content a, Sample Nos. 16 to 18 within the range of the present invention ($0.5 \leq a \leq 3.5$) all satisfied the characteristic evaluation described above. In contrast, Sample Nos. 14, 15 and 19 which are outside the range of the present invention did not. Sample No. 14 contains no MnO and exhibited a very low specific insulation resistance, and it was not possible to calculate εr, etc., thereof. Sample No. 15 with a of less than 0.5 exhibited a specific insulation resistance of $7.6 \times 10^{10}$ Ωm, which was lower than $10^{11}$ Ωm, and a MTTF of 65 hours, which was shorter than 150 hours. Sample No. 19 with a exceeding 3.5 exhibited a specific insulation resistance of $4.2 \times 10^{10}$ Ωm, which was lower than $10^{11}$ Ωm.

The results shown in Table 2 show that among Sample Nos. 20 to 25 for evaluating the effect of the CuO content b, Sample Nos. 21 to 24 inside the range of the present invention ($0.1 \leq b \leq 5.0$) all satisfied the characteristic evaluation described above. In contrast, among samples outside the range of the present invention, Sample No. 20 with a CuO content b of less than 0.1 exhibited a MTTF of 90 hours, which was shorter than 150 hours, and sample No. 25 with b exceeding 5.0 exhibited a specific insulation resistance of $3.1 \times 10^{10}$ Ωm, which was lower than $10^{11}$ Ωm.

The Table 2 results show that among Sample Nos. 26 to 31 for evaluating the effect of the $RO_n$ content c, all of Sample Nos. 27 to 30 within the range of the present invention ($10 \leq c \leq 20$) satisfied the characteristic evaluation described above. In contrast, samples outside the range of the present invention did not. Sample No. 26 with an $RO_n$ content c of less than 10 exhibited a MTTF of 120 hours, which was shorter than 150 hours, and generated high heat, i.e., exhibited a dielectric loss of 1.2% during application of an AC field of 10 kVp-p/mm at 300 kHz. Sample No. 31 with c exceeding 20.0 exhibited a relative dielectric constant of 270, which was lower than 300.

The results in Table 2 show that among the samples for evaluating the effect of the amount d of the sintering aid ($SiO_2$), Sample Nos. 33 to 36 within the range of the present invention ($0.8 \leq d \leq 5.0$) all satisfied the characteristic evaluation described above. In contrast, among Sample Nos. 32 and 37, which are outside the range of the present invention, Sample No. 32 with a sintering aid content d of less than 0.8 was not sufficiently sintered. Sample No. 37 with d exceeding 5.0 exhibited a MTTF of 120 hours, which was shorter than 150 hours.

The Table 2 results show that Sample Nos. 38 to 51 for evaluating the effect of $RO_n$, i.e., the type of rare-earth oxide, all satisfied the characteristic evaluation described above when their $RO_n$ content c was within the range of the present invention ($10 \leq c \leq 20$).

EXAMPLE 1-2

In this example, MO was further added to Sample No. 4 in EXAMPLE 1-1, and the MO content e was varied from the preferred range of the present invention to outside the range as shown in Table 3. Monolithic ceramic capacitors composed of dielectric ceramic compositions of Sample Nos. 52 to 62 were fabricated by the same process as in EXAMPLE 1-1. The electrical characteristics of these monolithic ceramic capacitors were then evaluated in the same manner as in EXAMPLE 1-1. The results are shown in Table 4.

TABLE 3

| Sample No. | m | x | R | a | b | c | d | M | e |
|---|---|---|---|---|---|---|---|---|---|
| 4 | 1.010 | 0.06 | Gd | 1.0 | 1.0 | 12 | 1.25 | — | 0.0 |
| 52 | 1.010 | 0.06 | Gd | 1.0 | 1.0 | 12 | 1.25 | Mg | 1.0 |
| 53 | 1.010 | 0.06 | Gd | 1.0 | 1.0 | 12 | 1.25 | Mg | 2.0 |
| 54 | 1.010 | 0.06 | Gd | 1.0 | 1.0 | 12 | 1.25 | Mg | 3.0 |
| 55 | 1.010 | 0.06 | Gd | 1.0 | 1.0 | 12 | 1.25 | Mg | 5.0 |
| 56 | 1.010 | 0.06 | Gd | 1.0 | 1.0 | 12 | 1.25 | Mg | 6.0 |
| 57 | 1.010 | 0.06 | Gd | 1.0 | 1.0 | 12 | 1.25 | Mg | 7.0 |
| 58 | 1.010 | 0.06 | Gd | 1.0 | 1.0 | 12 | 1.25 | Mg | 8.0 |
| 59 | 1.010 | 0.06 | Gd | 1.0 | 1.0 | 12 | 1.25 | Ni | 3.0 |
| 60 | 1.010 | 0.06 | Gd | 1.0 | 1.0 | 12 | 1.25 | Ni | 8.0 |
| 61 | 1.010 | 0.06 | Gd | 1.0 | 1.0 | 12 | 1.25 | Zn | 3.0 |
| 62 | 1.010 | 0.06 | Gd | 1.0 | 1.0 | 12 | 1.25 | Zn | 8.0 |

TABLE 4

| Sample No. | Baking Temperature (° C.) | ε r | tan δ [%] (1 kHz) | ρ [Ω m] | MTTF [hr] | tan δ [%] (300 kHz) |
|---|---|---|---|---|---|---|
| 4 | 1225 | 600 | 0.3 | 8.3 * 10$^{11}$ | 160 | 0.7 |
| 52 | 1200 | 620 | 0.4 | 6.6 * 10$^{11}$ | 180 | 0.8 |
| 53 | 1200 | 620 | 0.4 | 7.2 * 10$^{11}$ | 175 | 0.7 |
| 54 | 1225 | 630 | 0.3 | 6.3 * 10$^{11}$ | 180 | 0.7 |
| 55 | 1225 | 600 | 0.4 | 8.5 * 10$^{11}$ | 190 | 0.7 |
| 56 | 1200 | 600 | 0.3 | 4.2 * 10$^{11}$ | 190 | 0.7 |
| 57 | 1175 | 600 | 0.3 | 5.5 * 10$^{11}$ | 190 | 0.7 |
| 58 | 1175 | 550 | 0.3 | 5.2 * 10$^{11}$ | 200 | 0.6 |
| 59 | 1200 | 600 | 0.3 | 5.4 * 10$^{11}$ | 180 | 0.6 |
| 60 | 1200 | 550 | 0.4 | 6.6 * 10$^{11}$ | 190 | 0.7 |
| 61 | 1200 | 620 | 0.4 | 8.6 * 10$^{11}$ | 180 | 0.6 |
| 62 | 1225 | 560 | 0.4 | 5.6 * 10$^{11}$ | 190 | 0.7 |

The results in Table 4 show that Sample Nos. 52 to 57 containing 7.0 mol or less of MgO per 100 mol of $Ba_{1-x}Ca_x)_m TiO_3$ exhibited a longer MTTF than Sample No. 4 which did not contain MgO. Sample No. 58 with a MgO content beyond the preferable range of the present invention exhibited a relatively long MTTF but its relative dielectric constant was disadvantageously lower than that of Sample No. 4. Sample Nos. 59 and 60 in which NiO was added instead of MgO and Sample Nos. 61 and 62 in which ZnO was added instead of MgO also showed the results comparable to those of samples containing MgO.

EXAMPLE 1-3

In this example, X(Zr,Hf)O$_3$ was further added to Sample No. 4 in EXAMPLE 1-1, and the X(Zr,Hf)O$_3$ content f was varied from the preferred range of the present invention to outside the range, as shown in Table 5. Monolithic ceramic capacitors composed of dielectric ceramic compositions of Sample Nos. 63 to 77 were fabricated by the same process as in EXAMPLE 1-1. The electrical characteristics of these monolithic ceramic capacitors 1 were then evaluated in the same manner as in EXAMPLE 1-1. The results are shown in Table 6.

TABLE 5

| Sample No. | m | x | R | a | b | c | d | M | e | X | f |
|---|---|---|---|---|---|---|---|---|---|---|---|
| 4 | 1.010 | 0.06 | Gd | 1.0 | 1.0 | 12 | 1.25 | — | 0.0 | Ba | 0.0 |
| 63 | 1.010 | 0.06 | Gd | 1.0 | 1.0 | 12 | 1.25 | — | 0.0 | Ba | 6.0 |
| 64 | 1.010 | 0.06 | Gd | 1.0 | 1.0 | 12 | 1.25 | — | 0.0 | Ba | 9.0 |
| 65 | 1.010 | 0.06 | Gd | 1.0 | 1.0 | 12 | 1.25 | — | 0.0 | Ba | 12.0 |
| 66 | 1.010 | 0.06 | Gd | 1.0 | 1.0 | 12 | 1.25 | — | 0.0 | Ba | 15.0 |
| 67 | 1.010 | 0.06 | Gd | 1.0 | 1.0 | 12 | 1.25 | — | 0.0 | Ba | 18.0 |
| 68 | 1.010 | 0.06 | Gd | 1.0 | 1.0 | 12 | 1.25 | Mg | 3.0 | Ba | 0.0 |
| 69 | 1.010 | 0.06 | Gd | 1.0 | 1.0 | 12 | 1.25 | Mg | 3.0 | Ba | 6.0 |
| 70 | 1.010 | 0.06 | Gd | 1.0 | 1.0 | 12 | 1.25 | Mg | 3.0 | Ba | 9.0 |
| 71 | 1.010 | 0.06 | Gd | 1.0 | 1.0 | 12 | 1.25 | Mg | 3.0 | Ba | 12.0 |
| 72 | 1.010 | 0.06 | Gd | 1.0 | 1.0 | 12 | 1.25 | Mg | 3.0 | Ba | 15.0 |
| 73 | 1.010 | 0.06 | Gd | 1.0 | 1.0 | 12 | 1.25 | Mg | 3.0 | Ba | 18.0 |
| 74 | 1.010 | 0.06 | Gd | 1.0 | 1.0 | 12 | 1.25 | Ni | 3.0 | Sr | 12.0 |
| 75 | 1.010 | 0.06 | Gd | 1.0 | 1.0 | 12 | 1.25 | Ni | 3.0 | Sr | 18.0 |
| 76 | 1.010 | 0.06 | Gd | 1.0 | 1.0 | 12 | 1.25 | Zn | 3.0 | Ca | 12.0 |
| 77 | 1.010 | 0.06 | Gd | 1.0 | 1.0 | 12 | 1.25 | Zn | 3.0 | Ca | 18.0 |

TABLE 6

| Sample No. | Baking Temperature (° C.) | ε r | tan δ [%] (1 kHz) | ρ [Ω m] | MTTF [hr] | tan δ [%] (300 kHz) |
|---|---|---|---|---|---|---|
| 4 | 1225 | 600 | 0.3 | 8.3 * 10$^{11}$ | 160 | 0.7 |
| 63 | 1225 | 620 | 0.4 | 8.2 * 10$^{11}$ | 170 | 0.6 |
| 64 | 1225 | 660 | 0.4 | 6.2 * 10$^{11}$ | 170 | 0.6 |
| 65 | 1225 | 650 | 0.3 | 6.4 * 10$^{11}$ | 180 | 0.5 |
| 66 | 1250 | 600 | 0.4 | 7.5 * 10$^{11}$ | 190 | 0.6 |
| 67 | 1250 | 550 | 0.3 | 4.2 * 10$^{11}$ | 190 | 0.6 |
| 68 | 1200 | 630 | 0.3 | 8.9 * 10$^{11}$ | 190 | 0.6 |
| 69 | 1200 | 650 | 0.4 | 7.3 * 10$^{11}$ | 200 | 0.7 |
| 70 | 1200 | 650 | 0.4 | 8.8 * 10$^{11}$ | 200 | 0.7 |
| 71 | 1225 | 670 | 0.4 | 8.6 * 10$^{11}$ | 200 | 0.7 |
| 72 | 1225 | 630 | 0.4 | 8.5 * 10$^{11}$ | 190 | 0.7 |
| 73 | 1225 | 580 | 0.3 | 5.3 * 10$^{11}$ | 190 | 0.6 |
| 74 | 1200 | 660 | 0.3 | 7.7 * 10$^{11}$ | 190 | 0.6 |
| 75 | 1225 | 620 | 0.4 | 5.6 * 10$^{11}$ | 195 | 0.6 |
| 76 | 1200 | 660 | 0.4 | 8.3 * 10$^{11}$ | 190 | 0.6 |
| 77 | 1225 | 580 | 0.4 | 4.1 * 10$^{11}$ | 195 | 0.6 |

The results in Table 6 show that Sample Nos. 63 to 66 containing 15 mol or less of X(Zr,Hf)O$_3$ per 100 mol of $(Ba_{1-x}Ca_x)_m TiO_3$ exhibited a longer MTTF than Sample No. 4 which did not containing Ba(Zr,Hf)O$_3$. Sample No. 67 with a Ba (Zr,Hf)O$_3$ content beyond the preferred range of the present invention exhibited a relatively long MTTF but the relative dielectric constant was disadvantageously lower than that of Sample No. 4 not containing $Ba(Zr,Hf)O_3$.

The results in Table 6 show that Sample Nos. 68 to 73 in which 3 mol of MgO was added per 100 mol of $(Ba_{1-x}Ca_x)_m TiO_3$ and $Ba(Zr,Hf)O_3$ was added within the preferable range of the present invention exhibited an even longer MTTF. Sample No. 73 with a $Ba(Zr,Hf)O_3$ content beyond the preferred range of the present invention had a relative dielectric constant disadvantageously lower than that of Sample No. 4 in EXAMPLE 1-1. A sample containing NiO or ZnO instead of MgO, and $Sr(Zr,Hf)O_3$ or $Ca(Zr,Hf)O_3$ instead of $Ba(Zr,Hf)O_3$ showed results comparable to those of the sample containing MgO and Ba $(Zr,Hf)$ $O_3$.

It should be noted that the present invention is by no means limited by the examples described above.

Second Embodiment

The composition of the dielectric ceramic composition of the present invention will now be described.

A dielectric ceramic composition of the present invention contains a main component represented by general formula $100(Ba_{1-x}Ca_x)_m TiO_3 + aMnO + bCuO + cVO_{3/2} + dRO_n$ and e parts by weight of a sintering aid, in which m, x, a, b, c, d, and e satisfy the relationships $0.99 \leq m \leq 1.05$, $0.01 \leq x \leq 0.20$, $0.5 \leq a \leq 3.5$, $0.1 \leq b \leq 5.0$, $0.1 \leq c \leq 3.0$, $0.8 \leq d \leq 20$, and $0.8 \leq e \leq 5.0$.

The molar ratio m of (Ba+Ca) to Ti in the main component $(Ba_{1-x}Ca_x)_m TiO_3$ of the dielectric ceramic composition satisfies $0.99 \leq m \leq 1.050$. At m less than 0.990, the specific insulation resistance ρ is excessively low, i.e., is less than $10^{11}$ Ω·m. At m exceeding 1.050, the mean time to fail (MTTF) in high-temperature loading test (170° C., DC field intensity: 40 kV/mm, dielectric thickness: 10 μm) is short, e.g., less than 150 hours.

The Ca content x in calcium barium titanate $(Ba_{1-x}Ca_x)_m TiO_3$ satisfies $0.01 \leq x \leq 0.20$ in terms of molar ratio. When x is less than 0.01, the MTTF in high-temperature loading test is short, which is less than 150 hours. At x exceeding 0.20, the relative dielectric constant decreases to less than 300.

The MnO content a relative to $100(Ba_{1-x}Ca_x)_m TiO_3$ satisfies $0.5 \leq a \leq 3.5$ in terms of mols. If a is less than 0.5, the MTTF in high-temperature loading test is short, i.e., less than 150 hours. At a exceeding 3.5, the specific insulation resistance ρ becomes lower than $10^{11}$ Ω·m.

The CuO content b relative to $100(Ba_{1-x}Ca_x)_m TiO_3$ satisfies $0.1 \leq b \leq 5.0$ in terms of molar ratio. If b is less than 0.1, the MTTF becomes shorter than 150 hours. At b exceeding 5.0, the specific insulation resistance ρ becomes less than $10^{11}$ Ω·m.

The $VO_{3/2}$ content c relative to $100(Ba_{1-x}Ca_x)_m TiO_3$ satisfies $0.1 \leq c \leq 3.0$ in terms of molar ratio. When c is less than 0.1, the BDV (frequency: 60 Hz, dielectric thickness: 10 μm) decreases to less than 0.92 kVrms. In contrast, the specific insulation resistance decreases to less than $10^{11}$ Ω·m at c exceeding 3.0. Note "$VO_{3/2}$" means a vanadium oxide with a valence of 3. However, the valence of vanadium is not significant for the present invention. For example, a different valence, e.g., $VO_{5/2}$ may be employed as long as the object of the present invention is not impaired.

The $RO_n$ molar content d relative to $100(Ba_{1-x}Ca_x)_m TiO_3$ satisfies $8 \leq d \leq 20$. When d is less than 8, the MTTF in high-temperature loading test is as short as less than 100 hours. When d is more than 20, the relative dielectric constant decreases to less than 300. R may be at least one element selected from the group consisting of Y, La, Ce, Pr, Nd, Sm, Eu, Gd, Tb, Dy, Ho, Er, Tm, Yb and Lu, or may be a compound containing a suitable combination of two or more elements. Furthermore, n in $RO_n$ is a number determined by the valence of the rare-earth element R and represents a positive number required for maintaining electroneutrality. For example, when R is La, n=1.5, and when R is Ce, n=2.

The dielectric ceramic composition of the present invention contains e parts by weight of a sintering aid as an auxiliary component, in which the relationship $0.8 \leq e \leq 5.0$ is satisfied with respect to 100 parts by weight of the main component. When the sintering aid content e is less than 0.8, stable sintering becomes difficult. When e exceeds 5.0, the MTTF in the high-temperature loading test becomes as short as less than 150 hours. An existing sintering aid may be used as the sintering aid without particular limitation. In the present invention, $SiO_2$ is preferably used as the sintering aid.

The dielectric ceramic composition of the present invention preferably contains, as an additional component, 7.0 mol or less of MO per 100 mol of $(Ba_{1-x}Ca_x)_m TiO_3$. By adding MO to the main component, the relative dielectric ratio and reliability under high-temperature loading can be increased compared to when no MO is added. When MO content exceeds 7.0 mol, the relative dielectric constant becomes lower than when no MO is added, which is not preferable. Here, M represents at least one element selected from the group consisting of Mg, Ni and Zn. M may be one element or two or more elements suitably selected from these elements.

The dielectric ceramic composition of the present invention may contain, as an additional component, 15 mol or less of $X(Zr,Hf)O_3$ per 100 mol of $(Ba_{1-x}Ca_x)_m TiO_3$. When $X(Zr,Hf)O_3$ is added to the main component, the relative dielectric constant and reliability under high-temperature loading can be increased compared with when no X(Zr,Hf) $O_3$ is added. If $X(Zr,Hf)O_3$ exceeds 15 mol, the relative dielectric constant disadvantageously decreases compared with when no $X(Zr,Hf)O_3$ is added. Here, X denotes at least one element selected from the group consisting of Ba, Sr and Ca. Although the ratio of Hf to Zr in $X(Zr,Hf)O_3$ is not particularly limited, it is preferably 30 mol % or less from the standpoint of stabilizing the sinterability.

As described above, by newly adding CuO and $VO_{3/2}$ to the system containing the main component $(BaCa)TiO_3$, a rare-earth oxide $RO_n$ and MnO, a dielectric ceramic composition that can suppress heat generation during operation under high DC voltage or high-frequency and/or high AC voltage, exhibits a relative dielectric constant and a specific insulation resistance comparable to existing compositions, and a has high breakdown field and enhanced reliability can be obtained. The dielectric ceramic composition of the present invention can be used as a dielectric ceramic material for a monolithic ceramic capacitor which is expected to undergo further miniaturization and an increase in capacity.

The dielectric ceramic of the present invention contains a relatively large amount, i.e., 8 to 20 mol, of a rare-earth oxide $RO_n$ so that the ceramic is compatible with medium to high voltage; however, substantial part of the rare-earth oxide $RO_n$ dissolves into part of $(Ba_{1-x}Ca_x)_m TiO_3$ main phase particles such that each particle is divided into a core substantially free of $RO_n$ and a shell containing solid solution of $RO_n$. Because of such a particle structure, the phase transfer temperature of the ceramic of the present invention from tetragonal to cubic does not exceed room temperature, e.g., the temperature is about −80° C. Thus, at room temperature, the crystal structure is cubic or close to cubic. It is presumed that the effect of suppressing generation of heat during operation under high DC voltage or high-frequency and/or high AC voltage is derived from this crystal structure.

In particular, the breakdown field increases by the synergetic effects of the ceramic structure including locally dissolved rare-earth element $RO_n$ in $(Ba_{1-x}Ca_x)_mTiO_3$ and CuO and $VO_{3/2}$. This is presumably because existence of $VO_{3/2}$ in the grain boundaries of the ceramic structure changes the ratio between the portion of the electric field applied inside the grain and the portion of the electric field applied to the grain boundaries. Another factor that presumably contributes to improvement of breakdown field is the existence of CuO, since it enhances the homogeneity of the ceramic and thereby decreases an electrostrictive effect during high electrical field application.

Next, a method for making the dielectric ceramic composition of the present invention is described.

The method for making a $(Ba_{1-x}Ca_x)_mTiO_3$ material powder for the dielectric ceramic composition is not particularly limited as long as the ceramic composition represented by the above-described formula can be made. For example, a dry synthetic method of calcining a mixture of starting materials and then conducting solid-phase reaction may be employed. Alternatively, a wet synthetic method such as a hydrothermal synthetic method, a hydrolytic method or a sol-gel method may be employed.

The starting materials for $RO_n$, MnO, CuO, $VO_{3/2}$, and $SiO_2$, which are the components added to the $(Ba_{1-x}Ca_x)_mTiO_3$ material powder, i.e., the main component, are not limited to oxide powders as long as they produce the dielectric ceramic composition of the present invention. For example, carboxide powder, a solution of alkoxide or organic metal, or the like may be used as the starting material.

By sintering the above-described material powder, the dielectric ceramic composition of the present invention can be obtained.

Next, the structure of a monolithic ceramic capacitor of the present invention incorporating the dielectric ceramic composition of the present invention and a method for making the monolithic ceramic capacitor are described.

Figure 2:
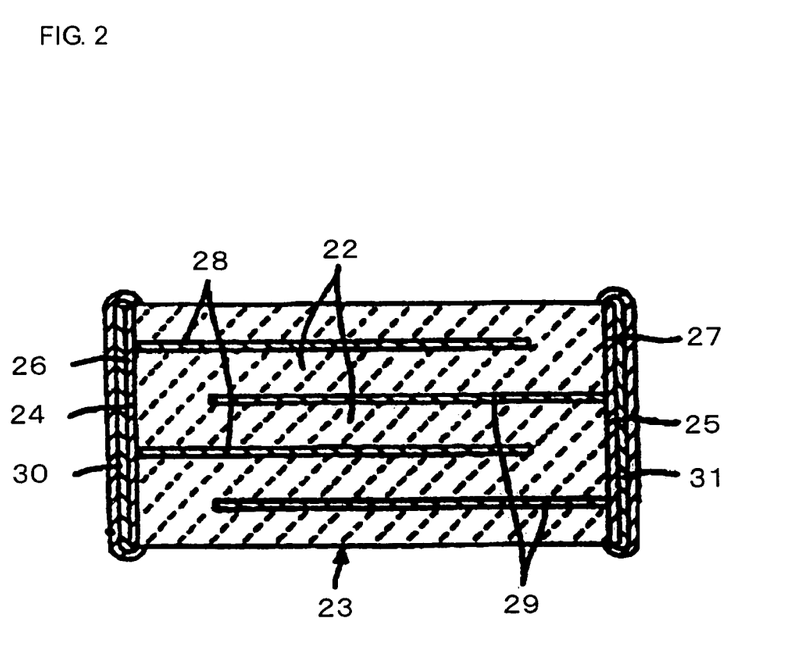
FIG. 2 is a cross-sectional view showing an embodiment (second embodiment) of a monolithic ceramic capacitor of the present invention.

In the description below, the subject invention is explained based on the embodiment shown in FIG. 2. FIG. 2 is a schematic cross-sectional view showing a monolithic ceramic capacitor according to this embodiment of the present invention.

As shown in FIG. 2, for example, a monolithic ceramic capacitor 21 of this embodiment includes a laminate 23 including laminated dielectric ceramic layers 22, first and second internal electrodes 28 and 29 interposed between the dielectric ceramic layers 22. A first external electrode 24 and a second external electrode 25 are formed on two end surfaces of the laminate 23, respectively, and these external electrodes are electrically connected to the first and second internal electrodes 28 and 29.

As shown in FIG. 2, each first internal electrode 28 extends from one end (left end in the drawing) of the dielectric ceramic layer 22 to near the other end (right end) of the dielectric ceramic layer 22. Each second internal electrode 29 extends from the right end of the dielectric ceramic layer to near the left end. The first and second internal electrode 28 and 29 are composed of a conductive metal containing, for example, Ni as a main component.

The first external electrode 24 is electrically connected to the first internal electrodes 28 in the laminate 23, and the second external electrode 25 is electrically connected to the second internal electrodes 29 in the laminate 23. The first and second external electrodes 24 and 25 are composed of a conductive metal containing Cu or Ag as a main component, for example. The surfaces of the first and second external electrodes 24 and 25 are coated with first plating layers 26 and 27 and then with second plating layers 30 and 31.

Since the dielectric ceramic composition of the present invention can be sintered in a reducing atmosphere, the internal electrodes of the capacitor are preferably composed of a conductive material including Ni or an alloy thereof, or Cu or an alloy thereof. In this manner, internal electrodes can be made at low cost.

Accordingly, the monolithic ceramic capacitor incorporating the dielectric ceramic composition of the present invention has a relative dielectric constant or 300 or more and a specific insulation resistance of $10^{11}$ Ω·m or more, and which generates smaller heat, i.e., has a dielectric loss of 0.8% or less during application of high-frequency high AC voltage (10 kVp-p/mm at 300 kHz). It also has a BDV (dielectric thickness: 10 μm) during application of AC field as high as 0.92 kVrms or more and a MTTF of 150 hours or more in high temperature-loading test (170° C., DC field intensity: 40 kV/mm, dielectric thickness: 10 μm), thereby exhibiting high reliability.

EXAMPLE 2-1

In this example, a monolithic ceramic capacitor 21 shown in FIG. 2 was made.

First, highly pure powders of $BaCO_3$, $CaCO_3$ and $TiO_2$ were prepared as the starting materials for the main component, $(Ba_{1-x}Ca_x)_mTiO_3$, and blended so that the modified Ca content x and the molar ratio m of (Ba+Ca) to Ti were as shown in Table 7.

The prepared powder was wet-mixed in a ball mill. After the powder was homogeneously dispersed, the powder was dried to obtain an adjusted powder.

The adjusted powder was calcined at a temperature of 1,000° C. or more to obtain a $(Ba_{1-x}Ca_x)_mTiO_3$ powder that satisfies x and m in Table 7.

As the starting materials for the auxiliary component, powders of $MnCO_3$, CuO, $V_2O_3$, $SiO_2$, $SiO_2$, $Y_2O_3$, $La_2O_3$, $CeO_2$, $Pr_5O_{11}$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$ were prepared. The starting materials for the auxiliary component were blended with the $(Ba_{1-x}Ca_x)_mTiO_3$ powder so that the compositions having x, m, a, b, c, and d shown in Table 7 below were obtained. In this embodiment, $SiO_2$ was used as the sintering aid.

Next, the resulting prepared powder was wet-mixed in a ball mill. After the powder was homogeneously dispersed, the powder was dried to obtain a material powder for a dielectric ceramic composition.

A polyvinyl butyral-based binder and an organic solvent such as ethanol were added to the material powder, and the resulting mixture was wet-mixed in a ball mill to prepare a slurry of the ceramic material powder.

The ceramic slurry was formed into a sheet by a doctor blade method to prepare a ceramic green sheet having a thickness of 14 μm, and then a conductive paste containing Ni as a main component was applied on the ceramic green sheet by screen-printing so as to form a conductive paste film for forming an internal electrode.

Subsequently, a green laminate was prepared by laminating ceramic green sheets such that the side at which the conductive paste film is exposed is arranged alternately, as shown in FIG. 2. The green laminate was heated to a temperature of 350° C. in a nitrogen atmosphere to burn off the binder, and then baked at a temperature shown in Table 8 for 2 hours in a reducing atmosphere containing a mixed gas of $H_2$—$N_2$—$H_2O$ at an oxygen partial pressure of $10^{-9}$ to $10^{-12}$ MPa so as to obtain a laminate 23.

A Ag paste containing a $B_2O_3$—$SiO_2$—BaO-based glass frit was prepared and applied onto the two end faces in which the internal electrodes 28 and 29 of the laminate 23 were exposed. Next, the Ag paste was baked at a temperature of 600° C. in a $N_2$ atmosphere so as to form the first and second external electrodes 24 and 25, which were electrically connected to the first and second internal electrodes 28 and 29, on the two end faces of the laminate 23. Subsequently, the surfaces of the first and second external electrodes 24 and 25 were subjected to two-step plating to form the first plating layers 26 and 27 and the second plating layers 30 and 31 to obtain a monolithic ceramic capacitor 21.

The external dimensions of the monolithic ceramic capacitor 21 obtained thereby were 3.2 mm in width, 4.5 mm in length, and 0.5 mm in thickness. The thickness of the dielectric ceramic layer interposed between the adjacent internal electrodes was 10 μm. The total number of the dielectric ceramic layers effective for obtaining capacitance was five, and the area of the opposing electrode per layer was $2.5 \times 10^{-6}$ $m^2$. Sample Nos. 1 to 57 of monolithic ceramic capacitors obtained thereby were analyzed to evaluate electrical characteristics. The results are shown in Table 7.

In Tables 7 and 8, asterisked samples are outside the range of the present invention (claims 7 to 12).

The method for evaluating electrical characteristics of the monolithic ceramic capacitors and the results of the evaluation will now be described.

A. Relative Dielectric Constant (εr) and Dielectric Loss (Tan δ)

Using an automatic bridge type meter of, a signal voltage of 50 Vrms/mm (1 kHz) was applied to each of samples in Table 7 to measure the capacitance (C) and dielectric loss (tan δ). The relative dielectric constant (εr) was calculated from the observed value of capacitance based on the structure of each monolithic ceramic capacitor. The results are shown in Table 8.

B. Specific Insulation Resistance (ρ)

Using an insulating-resistance tester, a DC voltage of 300 V was applied to each of samples in Table 7 for 1 minute to measure the insulating resistance at 25° C. and the specific insulation resistance (ρ) was calculated therefrom. The results are shown in Table 8.

C. Mean Time to Fail (MTTF)

As a high-temperature loading test, a DC voltage of 400 V was applied to each of samples in Table 7 at 170° C. to measure the change over time in insulating resistance. In the high-temperature loading test, each sample was assumed to have failed when its insulating resistance became $10^6$ Ω or less, and the mean time to fail of each sample was determined. The results are shown in Table 8.

D. Dielectric Loss (Tan δ) During Application of High-Frequency AC Voltage

A signal voltage of 10 kVp-p-p/mm at 300 kHz was applied to each of the samples shown in Table 7 to measure the dielectric loss (tan δ) to evaluate the generation of heat during application of high frequency. The results are shown in Table 8.

E. BDV

An AC field of 60 Hz was applied to each of the samples in Table 7 using an AC breakdown tester to evaluate BDV. The rate of voltage increase was 50 V/sec.

TABLE 7

| Sample No. | m | x | R | a | b | c | d | • |
|---|---|---|---|---|---|---|---|---|
| *1 | 0.98 | 0.06 | Gd | 1.0 | 1.0 | 1.0 | 12 | 1.25 |
| 2 | 0.99 | 0.06 | Gd | 1.0 | 1.0 | 1.0 | 12 | 1.25 |
| 3 | 1.00 | 0.06 | Gd | 1.0 | 1.0 | 1.0 | 12 | 1.25 |
| 4 | 1.01 | 0.06 | Gd | 1.0 | 1.0 | 1.0 | 12 | 1.25 |
| 5 | 1.03 | 0.06 | Gd | 1.0 | 1.0 | 1.0 | 12 | 1.25 |
| 6 | 1.05 | 0.06 | Gd | 1.0 | 1.0 | 1.0 | 12 | 1.25 |
| *7 | 1.06 | 0.06 | Gd | 1.0 | 1.0 | 1.0 | 12 | 1.25 |
| *8 | 1.01 | 0.00 | Gd | 1.0 | 1.0 | 1.0 | 12 | 1.25 |
| 9 | 1.01 | 0.01 | Gd | 1.0 | 1.0 | 1.0 | 12 | 1.25 |
| 10 | 1.01 | 0.10 | Gd | 1.0 | 1.0 | 1.0 | 12 | 1.25 |
| 11 | 1.01 | 0.15 | Gd | 1.0 | 1.0 | 1.0 | 12 | 1.25 |
| 12 | 1.01 | 0.20 | Gd | 1.0 | 1.0 | 1.0 | 12 | 1.25 |
| *13 | 1.01 | 0.25 | Gd | 1.0 | 1.0 | 1.0 | 12 | 1.25 |
| *14 | 1.01 | 0.06 | Gd | 0.0 | 1.0 | 1.0 | 12 | 1.25 |
| *15 | 1.01 | 0.06 | Gd | 0.2 | 1.0 | 1.0 | 12 | 1.25 |
| 16 | 1.01 | 0.06 | Gd | 0.5 | 1.0 | 1.0 | 12 | 1.25 |
| 17 | 1.01 | 0.06 | Gd | 2.0 | 1.0 | 1.0 | 12 | 1.25 |
| 18 | 1.01 | 0.06 | Gd | 3.5 | 1.0 | 1.0 | 12 | 1.25 |
| *19 | 1.01 | 0.06 | Gd | 4.0 | 1.0 | 1.0 | 12 | 1.25 |
| *20 | 1.01 | 0.06 | Gd | 1.0 | 0.0 | 1.0 | 12 | 1.25 |
| 21 | 1.01 | 0.06 | Gd | 1.0 | 0.1 | 1.0 | 12 | 1.25 |
| 22 | 1.01 | 0.06 | Gd | 1.0 | 0.5 | 1.0 | 12 | 1.25 |
| 23 | 1.01 | 0.06 | Gd | 1.0 | 2.0 | 1.0 | 12 | 1.25 |
| 24 | 1.01 | 0.06 | Gd | 1.0 | 5.0 | 1.0 | 12 | 1.25 |
| *25 | 1.01 | 0.06 | Gd | 1.0 | 6.0 | 1.0 | 12 | 1.25 |
| *26 | 1.01 | 0.06 | Gd | 1.0 | 1.0 | 0.0 | 12 | 1.25 |
| 27 | 1.01 | 0.06 | Gd | 1.0 | 1.0 | 0.1 | 12 | 1.25 |
| 28 | 1.01 | 0.06 | Gd | 1.0 | 1.0 | 0.2 | 12 | 1.25 |
| 29 | 1.01 | 0.06 | Gd | 1.0 | 1.0 | 0.5 | 12 | 1.25 |
| 30 | 1.01 | 0.06 | Gd | 1.0 | 1.0 | 3.0 | 12 | 1.25 |
| *31 | 1.01 | 0.06 | Gd | 1.0 | 1.0 | 3.5 | 12 | 1.25 |
| *32 | 1.01 | 0.06 | Gd | 1.0 | 1.0 | 1.0 | 7 | 1.25 |
| 33 | 1.01 | 0.06 | Gd | 1.0 | 1.0 | 1.0 | 8 | 1.25 |
| 34 | 1.01 | 0.06 | Gd | 1.0 | 1.0 | 1.0 | 10 | 1.25 |
| 35 | 1.01 | 0.06 | Gd | 1.0 | 1.0 | 1.0 | 15 | 1.25 |
| 36 | 1.01 | 0.06 | Gd | 1.0 | 1.0 | 1.0 | 20 | 1.25 |
| *37 | 1.01 | 0.06 | Gd | 1.0 | 1.0 | 1.0 | 22 | 1.25 |
| *38 | 1.01 | 0.06 | Gd | 1.0 | 1.0 | 1.0 | 12 | 0.60 |
| 39 | 1.01 | 0.06 | Gd | 1.0 | 1.0 | 1.0 | 12 | 0.80 |
| 40 | 1.01 | 0.06 | Gd | 1.0 | 1.0 | 1.0 | 12 | 2.00 |
| 41 | 1.01 | 0.06 | Gd | 1.0 | 1.0 | 1.0 | 12 | 3.00 |
| 42 | 1.01 | 0.06 | Gd | 1.0 | 1.0 | 1.0 | 12 | 5.00 |
| *43 | 1.01 | 0.06 | Gd | 1.0 | 1.0 | 1.0 | 12 | 6.00 |
| 44 | 1.01 | 0.06 | Y | 1.0 | 1.0 | 1.0 | 12 | 1.25 |
| 45 | 1.01 | 0.06 | La | 1.0 | 1.0 | 1.0 | 12 | 1.25 |
| 46 | 1.01 | 0.06 | Ce | 1.0 | 1.0 | 1.0 | 12 | 1.25 |
| 47 | 1.01 | 0.06 | Pr | 1.0 | 1.0 | 1.0 | 12 | 1.25 |
| 48 | 1.01 | 0.06 | Nd | 1.0 | 1.0 | 1.0 | 12 | 1.25 |
| 49 | 1.01 | 0.06 | Sm | 1.0 | 1.0 | 1.0 | 12 | 1.25 |
| 50 | 1.01 | 0.06 | Eu | 1.0 | 1.0 | 1.0 | 12 | 1.25 |
| 51 | 1.01 | 0.06 | Tb | 1.0 | 1.0 | 1.0 | 12 | 1.25 |
| 52 | 1.01 | 0.06 | Dy | 1.0 | 1.0 | 1.0 | 12 | 1.25 |
| 53 | 1.01 | 0.06 | Ho | 1.0 | 1.0 | 1.0 | 12 | 1.25 |
| 54 | 1.01 | 0.06 | Er | 1.0 | 1.0 | 1.0 | 12 | 1.25 |
| 55 | 1.01 | 0.06 | Tm | 1.0 | 1.0 | 1.0 | 12 | 1.25 |
| 56 | 1.01 | 0.06 | Yb | 1.0 | 1.0 | 1.0 | 12 | 1.25 |
| 57 | 1.01 | 0.06 | Lu | 1.0 | 1.0 | 1.0 | 12 | 1.25 |

TABLE 8

| Sample No. | Baking Temperature (° C.) | $\epsilon r$ | tan δ [%] (1 kHz) | ρ [Ω m] | MTTF [h] | tan δ [%] (300 kHz) | BDV [kV$_{rms}$] |
|---|---|---|---|---|---|---|---|
| *1 | 1200 | 650 | 0.2 | $6.5 * 10^{10}$ | 120 | 0.7 | 0.50 |
| 2 | 1200 | 630 | 0.2 | $6.7 * 10^{11}$ | 150 | 0.7 | 0.93 |
| 3 | 1200 | 620 | 0.2 | $7.2 * 10^{11}$ | 155 | 0.7 | 0.92 |
| 4 | 1225 | 600 | 0.2 | $8.3 * 10^{11}$ | 160 | 0.7 | 0.94 |
| 5 | 1250 | 580 | 0.7 | $6.5 * 10^{11}$ | 160 | 1.2 | 0.92 |
| 6 | 1275 | 550 | 0.7 | $6.2 * 10^{11}$ | 150 | 1.2 | 0.93 |
| *7 | 1300 | 530 | 0.7 | $4.4 * 10^{11}$ | 100 | 1.2 | 0.92 |
| *8 | 1225 | 600 | 0.2 | $2.1 * 10^{11}$ | 130 | 0.8 | 0.94 |
| 9 | 1200 | 620 | 0.3 | $7.7 * 10^{11}$ | 150 | 0.8 | 0.94 |
| 10 | 1200 | 580 | 0.3 | $8.9 * 10^{11}$ | 150 | 0.6 | 0.93 |
| 11 | 1200 | 540 | 0.3 | $9.2 * 10^{11}$ | 160 | 0.6 | 0.94 |
| 12 | 1175 | 400 | 0.5 | $8.8 * 10^{11}$ | 160 | 0.7 | 0.95 |
| *13 | 1175 | 280 | 0.5 | $5.5 * 10^{12}$ | 150 | 0.7 | 0.99 |
| *14 | 1225 | — | — | $3.4 * 10^{7}$ | — | — | — |
| *15 | 1200 | 610 | 0.5 | $7.6 * 10^{10}$ | 40 | 0.8 | 0.62 |
| 16 | 1200 | 600 | 0.5 | $5.2 * 10^{11}$ | 150 | 0.8 | 0.93 |
| 17 | 1200 | 580 | 0.2 | $5.3 * 10^{11}$ | 160 | 0.6 | 0.96 |
| 18 | 1175 | 570 | 0.2 | $5.8 * 10^{11}$ | 160 | 0.6 | 0.93 |
| *19 | 1175 | 540 | 0.2 | $4.2 * 10^{10}$ | 80 | 0.6 | 0.45 |
| *20 | 1200 | 610 | 0.3 | $6.6 * 10^{12}$ | 130 | 0.6 | 0.92 |
| 21 | 1200 | 600 | 0.3 | $8.0 * 10^{11}$ | 150 | 0.6 | 0.93 |
| 22 | 1200 | 620 | 0.3 | $6.6 * 10^{11}$ | 155 | 0.6 | 0.92 |
| 23 | 1175 | 500 | 0.2 | $5.8 * 10^{11}$ | 160 | 0.7 | 0.92 |
| 24 | 1175 | 450 | 0.2 | $4.5 * 10^{11}$ | 150 | 0.7 | 0.94 |
| *25 | 1175 | 400 | 0.2 | $2.2 * 10^{10}$ | 50 | 0.7 | 0.46 |
| *26 | 1150 | 630 | 0.7 | $7.8 * 10^{11}$ | 150 | 0.7 | 0.72 |
| 27 | 1175 | 600 | 0.2 | $5.2 * 10^{11}$ | 150 | 0.6 | 0.92 |
| 28 | 1225 | 580 | 0.2 | $4.5 * 10^{11}$ | 150 | 0.6 | 0.93 |
| 29 | 1250 | 550 | 0.1 | $3.2 * 10^{11}$ | 150 | 0.6 | 0.95 |
| 30 | 1250 | 430 | 0.1 | $2.4 * 10^{11}$ | 160 | 0.6 | 0.96 |
| *31 | 1250 | — | — | $5.3 * 10^{6}$ | — | — | — |
| *32 | 1150 | 800 | 0.3 | $5.9 * 10^{12}$ | 80 | 1.2 | 0.92 |
| 33 | 1175 | 730 | 0.3 | $8.8 * 10^{11}$ | 150 | 0.6 | 0.92 |
| 34 | 1225 | 550 | 0.3 | $5.4 * 10^{11}$ | 150 | 0.6 | 0.93 |
| 35 | 1250 | 480 | 0.3 | $4.2 * 10^{11}$ | 160 | 0.6 | 0.96 |
| 36 | 1275 | 350 | 0.4 | $4.1 * 10^{11}$ | 160 | 0.6 | 0.96 |
| *37 | 1300 | 270 | 0.4 | $3.3 * 10^{11}$ | 170 | 0.6 | 0.98 |
| *38 | Insufficient Sintering | — | — | — | — | — | — |
| 39 | 1250 | 540 | 0.5 | $3.3 * 10^{12}$ | 150 | 0.6 | 0.93 |
| 40 | 1150 | 600 | 0.4 | $4.3 * 10^{12}$ | 160 | 0.7 | 0.92 |
| 41 | 1125 | 580 | 0.4 | $7.4 * 10^{11}$ | 155 | 0.7 | 0.94 |
| 42 | 1100 | 540 | 0.2 | $7.7 * 10^{11}$ | 150 | 0.5 | 0.93 |
| *43 | 1100 | 500 | 0.1 | $8.3 * 10^{11}$ | 90 | 0.5 | 0.93 |
| 44 | 1225 | 570 | 0.2 | $7.4 * 10^{11}$ | 150 | 0.5 | 0.92 |
| 45 | 1150 | 580 | 0.2 | $7.7 * 10^{11}$ | 150 | 0.5 | 0.92 |
| 46 | 1150 | 560 | 0.3 | $8.3 * 10^{11}$ | 150 | 0.6 | 0.93 |
| 47 | 1150 | 550 | 0.3 | $7.4 * 10^{11}$ | 160 | 0.6 | 0.93 |
| 48 | 1150 | 600 | 0.1 | $7.7 * 10^{11}$ | 155 | 0.5 | 0.92 |
| 49 | 1175 | 580 | 0.3 | $8.3 * 10^{11}$ | 155 | 0.5 | 0.92 |
| 50 | 1175 | 590 | 0.2 | $7.4 * 10^{11}$ | 155 | 0.5 | 0.92 |
| 51 | 1200 | 570 | 0.2 | $7.7 * 10^{11}$ | 150 | 0.7 | 0.93 |
| 52 | 1200 | 550 | 0.4 | $8.3 * 10^{11}$ | 150 | 0.8 | 0.93 |
| 53 | 1225 | 600 | 0.3 | $7.4 * 10^{11}$ | 150 | 0.8 | 0.93 |
| 54 | 1225 | 590 | 0.3 | $7.7 * 10^{11}$ | 160 | 0.7 | 0.93 |
| 55 | 1225 | 590 | 0.2 | $8.3 * 10^{11}$ | 155 | 0.7 | 0.92 |
| 56 | 1250 | 600 | 0.3 | $7.4 * 10^{11}$ | 155 | 0.6 | 0.93 |
| 57 | 1250 | 580 | 0.4 | $7.7 * 10^{11}$ | 155 | 0.6 | 0.93 |

The results in Table 8 show that among the samples for evaluating the effect of the molar ratio m of (Ba+Ca) to Ti in $(Ba_{1-x}Ca_x)_mTiO_3$, Sample Nos. 2 to 6 are within the range of the present invention (0.990≦m≦1.050) and exhibited a dielectric loss of 0.8% or less at 50 Vrms/mm (1 kHz) and a specific insulation resistance of $10^{11}$ Ωm or more while retaining a relative dielectric constant of 300 or more. The MTTF in the high-temperature loading test (170° C., DC field intensity: 40 kV/mm) was 150 hours or more, thereby showing high reliability, and the dielectric loss during application of high-frequency AC current of 10 kVp-p/mm at 300 kHz was 0.8% or less, thereby generating small heat. The BDV was as high as 0.92 kVrms. In contrast, among samples outside the range of the present invention, Sample No. 1 with m of less than 0.990 exhibited a specific insulation resistance of 6.5×$10^{10}$ Ωm, which was less than $10^{11}$ Ωm and Sample No. 7 with m exceeding 1.050 exhibited a MTTF in the high-temperature loading test of 100 hours, which was shorter than 150 hours.

Sample Nos. 9 to 12 with a modified Ca content x within the range of the present invention (0.01≦x≦0.20) all satisfied the above-described characteristics. In contrast, of the samples outside the range of the present invention, Sample No. 8 with an modified Ca content x of less than 0.01 exhibited a MTTF of 130 hours, which was shorter than 150 hours, and Sample No. 13 with x exceeding 0.20 exhibited a relative dielectric constant of 280, which was lower than 300.

The Table 8 results show that among Sample Nos. 14 to 19 for evaluating the effect of the MnO content a, Sample Nos. 16 to 18 within the range of the present invention ($0.5 \leq a \leq 3.5$) all satisfied the characteristics described above. In contrast, Sample Nos. 14, 15, and 19 outside the range of the present invention did not, Sample No. 14 not containing MnO exhibited very low specific insulation resistance, and it was not possible to calculate Er, etc., thereof. Sample No. 15 with a of less than 0.5 exhibited a specific insulation resistance of $7.6 \times 10^{10}$ Ωm, which was lower than $10^{11}$ Ωm, and a MTTF of 40 hours, which was shorter than 150 hours. Sample No. 19 with a exceeding 3.5 exhibited a specific insulation resistance of $4.2 \times 10^{10}$ Ωm, which was lower than $10^{11}$ Ωm.

The results shown in Table 8 show that among samples for evaluating the effect of the CuO content b, Sample Nos. 21 to 24 are inside the range of the present invention ($0.1 \leq b \leq 5.0$) and all satisfied the characteristic evaluation described above. In contrast, Sample Nos. 20 and 25 are outside the range of the present invention. Sample No. 20 with a CuO content b of less than 0.1 exhibited a MTTF of 130 hours, which was shorter than 150 hours. Sample No. 25 with b exceeding 5.0 exhibited a specific insulation resistance of $2.2 \times 10^{10}$ Ωm, which was lower than $10^{11}$ Ωm.

The Table 8 results show that among samples for evaluating the effect of the $VO_{3/2}$ content c, Sample Nos. 27 to 30, within the range of the present invention ($0.1 \leq c \leq 3.0$), all satisfied the characteristics described above. In contrast, Sample Nos. 26 and 31 are outside the range of the present invention. Sample No. 26 not containing $VO_{3/2}$ exhibited a BDV of 0.72 kVrms, which was not satisfactory. Sample No. 31 with c exceeding 3.0 showed a very low specific insulation resistance, and it was not possible to calculate εr, etc., thereof.

The results shown in Table 8 show that among samples for evaluating the effect of the $RO_n$ content d, Sample Nos. 33 to 36 are within the range of the present invention ($8 \leq d \leq 20$) and all satisfied the characteristics described above. In contrast, Sample Nos. 32 and 37 are outside the range of the present invention. Sample No. 32 with an $RO_n$ content c of less than 8 exhibited a MTTF of 80 hours, which was shorter than 150 hours, and generated high heat, i.e., exhibited a dielectric loss of 1.2% during application of an AC field of 10 kVp-p/mm at 300 kHz. Sample No. 37 with d exceeding 20.0 exhibited a relative dielectric constant of 270, which was lower than 300.

The results in Table 8 show that when evaluating the effect of the amount e of the sintering aid ($SiO_2$), Sample Nos. 39 to 42, within the range of the present invention ($0.8 \leq e \leq 5.0$), all satisfied the characteristic evaluation described above. In contrast, Sample Nos. 38 and 43 are outside the range of the present invention and did not. Sample No. 38 with a sintering aid content e of less than 0.8 was not sufficiently sintered. Sample No. 43 with e exceeding 5.0 exhibited a MTTF of 90 hours, which was shorter than 150 hours.

The Table 8 results show that Sample Nos. 44 to 57 for evaluating the effect of $RO_n$, i.e., the type of rare-earth oxide, all satisfied the characteristic evaluation described above when their $RO_n$ content d was within the range of the present invention ($8 \leq d \leq 20$).

EXAMPLE 2-2

In this example, as shown in Table 9, MO was further added to Sample No. 29 in EXAMPLE 2-1, and the MO content f was varied from the preferred range of the present invention to outside the range. Monolithic ceramic capacitors composed of dielectric ceramic compositions of Sample Nos. 58 to 68 were fabricated by the same process as in EXAMPLE 2-1. The electrical characteristics of these monolithic ceramic capacitors 21 were then evaluated in the same manner as in EXAMPLE 2-1. The results are shown in Table 10.

TABLE 9

| Sample No. | m | x | R | a | b | c | d | e | M | f |
|---|---|---|---|---|---|---|---|---|---|---|
| 29 | 1.01 | 0.06 | Gd | 1.0 | 1.0 | 0.5 | 12 | 1.25 | — | 0.0 |
| 58 | 1.01 | 0.06 | Gd | 1.0 | 1.0 | 0.5 | 12 | 1.25 | Mg | 1.0 |
| 59 | 1.01 | 0.06 | Gd | 1.0 | 1.0 | 0.5 | 12 | 1.25 | Mg | 2.0 |
| 60 | 1.01 | 0.06 | Gd | 1.0 | 1.0 | 0.5 | 12 | 1.25 | Mg | 3.0 |
| 61 | 1.01 | 0.06 | Gd | 1.0 | 1.0 | 0.5 | 12 | 1.25 | Mg | 5.0 |
| 62 | 1.01 | 0.06 | Gd | 1.0 | 1.0 | 0.5 | 12 | 1.25 | Mg | 6.0 |
| 63 | 1.01 | 0.06 | Gd | 1.0 | 1.0 | 0.5 | 12 | 1.25 | Mg | 7.0 |
| 64 | 1.01 | 0.06 | Gd | 1.0 | 1.0 | 0.5 | 12 | 1.25 | Mg | 8.0 |
| 65 | 1.01 | 0.06 | Gd | 1.0 | 1.0 | 0.5 | 12 | 1.25 | Ni | 3.0 |
| 66 | 1.01 | 0.06 | Gd | 1.0 | 1.0 | 0.5 | 12 | 1.25 | Ni | 8.0 |
| 67 | 1.01 | 0.06 | Gd | 1.0 | 1.0 | 0.5 | 12 | 1.25 | Zn | 3.0 |
| 68 | 1.01 | 0.06 | Gd | 1.0 | 1.0 | 0.5 | 12 | 1.25 | Zn | 8.0 |

TABLE 10

| Sample No. | Baking Temperature (° C.) | εr | tan δ [%] (1 kHz) | ρ [Ω m] | MTTF [h] | tan δ [%] (300 kHz) | BDV [kV$_{rms}$] |
|---|---|---|---|---|---|---|---|
| 29 | 1250 | 550 | 0.1 | $3.2 * 10^{11}$ | 150 | 0.6 | 0.95 |
| 58 | 1200 | 620 | 0.2 | $6.6 * 10^{11}$ | 170 | 0.8 | 0.93 |
| 59 | 1200 | 630 | 0.2 | $7.2 * 10^{11}$ | 175 | 0.7 | 0.92 |
| 60 | 1225 | 620 | 0.2 | $6.3 * 10^{11}$ | 180 | 0.7 | 0.95 |
| 61 | 1225 | 480 | 0.2 | $8.5 * 10^{11}$ | 190 | 0.7 | 0.95 |
| 62 | 1200 | 350 | 0.2 | $5.5 * 10^{11}$ | 180 | 0.7 | 0.94 |
| 63 | 1175 | 310 | 0.1 | $5.3 * 10^{11}$ | 180 | 0.7 | 0.94 |
| 64 | 1175 | 220 | 0.1 | $4.2 * 10^{11}$ | 180 | 0.6 | 0.96 |
| 65 | 1200 | 600 | 0.2 | $5.4 * 10^{11}$ | 180 | 0.6 | 0.92 |
| 66 | 1200 | 220 | 0.1 | $6.6 * 10^{11}$ | 180 | 0.7 | 0.93 |
| 67 | 1200 | 620 | 0.3 | $8.6 * 10^{11}$ | 180 | 0.6 | 0.93 |
| 68 | 1225 | 200 | 0.1 | $5.6 * 10^{11}$ | 180 | 0.7 | 0.97 |

The results in Table 10 show that Sample Nos. 58 to 63 containing 7.0 mol or less of MgO per 100 mol of $(Ba_{1-x}Ca_x)_mTiO_3$ exhibited a longer MTTF than Sample No. 29 which does not contain MgO. Sample No. 64 with a MgO content beyond the preferable range of the present invention exhibited a relatively long MTTF but its relative dielectric constant was disadvantageously lower than Sample No. 29. Sample Nos. 65 and 66 in which NiO was added instead of MgO and Sample Nos. 67 and 68 in which ZnO was added instead of MgO showed results comparable to those of samples containing MgO.

EXAMPLE 2-3

In this example, $X(Zr,Hf)O_3$ was added to Sample No. 29 in EXAMPLE 2-1, and the $X(Zr,Hf)O_3$ content g was varied from the preferred range of the present invention to outside the range as shown in Table 11. Monolithic ceramic capacitors composed of dielectric ceramic compositions of Sample Nos. 69 to 83 were fabricated by the same process as in EXAMPLE 2-1. The electrical characteristics of these monolithic ceramic capacitors 21 were then evaluated in the same manner as in EXAMPLE 2-1. The results are shown in Table 12.

The results in Table 12 show that Sample Nos. 69 to 72 containing 15 mol or less of $X(Zr,Hf)O_3$ per 100 mol of $(Ba_{1-x}Ca_x)_mTiO_3$ exhibited a longer MTTF than Sample No. 29, which does not contain $Ba(Zr,Hf)O_3$. Sample No. 73 with a $Ba(Zr,Hf)O_3$ content beyond the preferred range of the present invention exhibited a relatively long MTTF but had a relative dielectric constant was disadvantageously lower than that of Sample No. 29 not containing $Ba(Zr,Hf)O_3$.

The results in Table 12 show that Sample Nos. 74 to 78 in which 3 mol of MgO was added per 100 mol of $(Ba_{1-x}Ca_x)_mTiO_3$ and $Ba(Zr,Hf)O_3$ was added within the preferable range of the present invention exhibited still longer MTTF. Sample No. 79 with a $Ba(Zr,Hf)O_3$ content beyond the preferred range of the present invention exhibited a relatively long MTTF but the relative dielectric constant was disadvantageously lower than that of Sample No. 29 in EXAMPLE 2-1. A sample containing NiO or ZnO instead of MgO and $Sr(Zr,Hf)O_3$ or $Ca(Zr,Hf)O_3$ instead of $Ba(Zr,Hf)O_3$ showed results comparable to those of the sample containing MgO and $Ba(Zr,Hf)O_3$.

It should be noted that the present invention is by no means limited by the individual examples described above.

TABLE 11

| Sample No. | m | x | R | a | b | c | d | e | M | f | X | g |
|---|---|---|---|---|---|---|---|---|---|---|---|---|
| 29 | 1.01 | 0.06 | Gd | 1.0 | 1.0 | 0.5 | 12 | 1.25 | — | 0.0 | Ba | 0.0 |
| 69 | 1.01 | 0.06 | Gd | 1.0 | 1.0 | 0.5 | 12 | 1.25 | — | 0.0 | Ba | 6.0 |
| 70 | 1.01 | 0.06 | Gd | 1.0 | 1.0 | 0.5 | 12 | 1.25 | — | 0.0 | Ba | 9.0 |
| 71 | 1.01 | 0.06 | Gd | 1.0 | 1.0 | 0.5 | 12 | 1.25 | — | 0.0 | Ba | 12.0 |
| 72 | 1.01 | 0.06 | Gd | 1.0 | 1.0 | 0.5 | 12 | 1.25 | — | 0.0 | Ba | 15.0 |
| 73 | 1.01 | 0.06 | Gd | 1.0 | 1.0 | 0.5 | 12 | 1.25 | — | 0.0 | Ba | 18.0 |
| 74 | 1.01 | 0.06 | Gd | 1.0 | 1.0 | 0.5 | 12 | 1.25 | Mg | 3.0 | Ba | 0.0 |
| 75 | 1.01 | 0.06 | Gd | 1.0 | 1.0 | 0.5 | 12 | 1.25 | Mg | 3.0 | Ba | 6.0 |
| 76 | 1.01 | 0.06 | Gd | 1.0 | 1.0 | 0.5 | 12 | 1.25 | Mg | 3.0 | Ba | 9.0 |
| 77 | 1.01 | 0.06 | Gd | 1.0 | 1.0 | 0.5 | 12 | 1.25 | Mg | 3.0 | Ba | 12.0 |
| 78 | 1.01 | 0.06 | Gd | 1.0 | 1.0 | 0.5 | 12 | 1.25 | Mg | 3.0 | Ba | 15.0 |
| 79 | 1.01 | 0.06 | Gd | 1.0 | 1.0 | 0.5 | 12 | 1.25 | Mg | 3.0 | Ba | 18.0 |
| 80 | 1.01 | 0.06 | Gd | 1.0 | 1.0 | 0.5 | 12 | 1.25 | Ni | 3.0 | Sr | 12.0 |
| 81 | 1.01 | 0.06 | Gd | 1.0 | 1.0 | 0.5 | 12 | 1.25 | Ni | 3.0 | Sr | 18.0 |
| 82 | 1.01 | 0.06 | Gd | 1.0 | 1.0 | 0.5 | 12 | 1.25 | Zn | 3.0 | Ca | 12.0 |
| 83 | 1.01 | 0.06 | Gd | 1.0 | 1.0 | 0.5 | 12 | 1.25 | Zn | 3.0 | Ca | 18.0 |

TABLE 12

| Sample No. | Baking Temperature (° C.) | $\epsilon r$ | tan δ [%] (1 kHz) | ρ [Ωm] | MTTF [h] | tan δ [%] (300 kHz) | BDV[kV$_{rms}$] |
|---|---|---|---|---|---|---|---|
| 29 | 1250 | 550 | 0.1 | $3.2 * 10^{11}$ | 150 | 0.6 | 0.95 |
| 69 | 1225 | 620 | 0.1 | $8.1 * 10^{11}$ | 170 | 0.6 | 0.93 |
| 70 | 1225 | 650 | 0.1 | $6.0 * 10^{11}$ | 170 | 0.6 | 0.92 |
| 71 | 1225 | 640 | 0.1 | $6.7 * 10^{11}$ | 170 | 0.5 | 0.96 |
| 72 | 1225 | 440 | 0.1 | $7.5 * 10^{11}$ | 170 | 0.6 | 0.97 |
| 73 | 1225 | 290 | 0.1 | $4.1 * 10^{11}$ | 180 | 0.6 | 0.99 |
| 74 | 1200 | 630 | 0.2 | $8.9 * 10^{11}$ | 180 | 0.6 | 0.92 |
| 75 | 1200 | 640 | 0.2 | $7.3 * 10^{11}$ | 180 | 0.7 | 0.92 |
| 76 | 1200 | 650 | 0.2 | $8.7 * 10^{11}$ | 180 | 0.7 | 0.92 |
| 77 | 1225 | 640 | 0.2 | $8.6 * 10^{11}$ | 180 | 0.7 | 0.93 |
| 78 | 1225 | 440 | 0.2 | $8.5 * 10^{11}$ | 180 | 0.7 | 0.93 |
| 79 | 1225 | 290 | 0.1 | $5.2 * 10^{11}$ | 170 | 0.6 | 0.96 |
| 80 | 1200 | 630 | 0.1 | $7.7 * 10^{11}$ | 180 | 0.6 | 0.94 |
| 81 | 1225 | 280 | 0.1 | $5.6 * 10^{11}$ | 180 | 0.6 | 0.96 |
| 82 | 1200 | 630 | 0.2 | $8.0 * 10^{11}$ | 180 | 0.6 | 0.92 |
| 83 | 1225 | 250 | 0.1 | $4.1 * 10^{11}$ | 170 | 0.6 | 0.96 |

INDUSTRIAL APPLICABILITY

According to the present invention, a monolithic ceramic capacitor that generates small heat during operation under high-frequency and/or high AC voltage or high-frequency DC voltage, has a relative dielectric constant and a specific insulation resistance comparative to the background art, and exhibits high reliability can be obtained.

Furthermore, according to the present invention, a monolithic ceramic capacitor with a higher breakdown field and higher reliability can be obtained.

Therefore, the present invention is widely applicable to the fields of technology related to monolithic ceramic capacitors for use in various electric and electronic devices and dielectric ceramic compositions used in the devices.

The invention claimed is:

1. A dielectric ceramic composition comprising a substance represented by general formula $100(Ba_{1-x}Ca_x)_m TiO_3 + aMnO + bCuO + cRO_n$, wherein the coefficients 100, a, b and c each represent a mols; R represents at least one element selected from the group consisting of Y, La, Ce, Pr, Nd, Sm, Eu, Gd, Tb, Dy, Ho, Er, Tm, Yb and Lu; and n represents a number determined by the valence of the rare-earth element R and is a positive number required for maintaining electroneutrality and d parts by weight per 100 parts by weight of the compound represented by $(Ba_{1-x}Ca_x)_m TiO_3$ of a sintering aid,
wherein
$0.990 \leq m \leq 1.050$,
$0.01 \leq x \leq 0.20$,
$0.5 \leq a \leq 3.5$,
$0.1 \leq b \leq 5.0$,
$8 \leq c \leq 20$, and
$0.8 \leq d \leq 5.0$.

2. The dielectric ceramic composition according to claim 1, wherein $10 \leq c \leq 20$ and containing 7.0 mols or less of MO (per 100 mol of the compound represented by $(Ba_{1-x}Ca_x)_m TiO_3$, wherein M is at least one element selected from the group consisting of Mg, Ni and Zn.

3. The dielectric ceramic composition according to claim 2, containing 15 mols or less of $X(Zr,Hf)O_3$ per 100 mol of the compound represented by $(Ba_{1-x}Ca_x)_m TiO_3$, wherein X is at least one element selected from the group consisting of Ba, Sr, and Ca.

4. The dielectric ceramic composition according to claim 3, containing d mols of $VO_{3/2}$, wherein $0.1 \leq d \leq 3.0$.

5. The dielectric ceramic composition according to claim 4, wherein $0.990 \leq m \leq 1.010$, $0.06 \leq x \leq 0.15$, $1 \leq a \leq 2$, $1 \leq b \leq 2$, $12 \leq c \leq 18$, and $1.25 \leq d \leq 3$, R comprises Gd, M comprises Mg, X comprises Ba, the amount of MO is 1-6 mols, and the amount of $X(Zr,Hf)O_3$ is 12 mols or less.

6. The dielectric ceramic composition according to claim 5, wherein the sintering aid is $SiO_2$.

7. The dielectric ceramic composition according to claim 1, wherein $10 \leq c \leq 20$ and containing 15 mol or less of $X(Zr,Hf)O_3$ per 100 mol of the compound represented by $(Ba_{1-x}Ca_x)_m TiO_3$, wherein X is at least one element selected from the group consisting of Ba, Sr, and Ca.

8. The dielectric ceramic composition according to claim 7, wherein the sintering aid is $SiO_2$.

9. The dielectric ceramic composition according to claim 7, containing 12 mol or less of $X(Zr,Hf)O_3$.

10. The dielectric ceramic composition according to claim 1, wherein $10 \leq c \leq 20$ and wherein the sintering aid is $SiO_2$.

11. The dielectric ceramic composition according to claim 1, containing d mols of $VO_{3/2}$, wherein $0.1 \leq d \leq 3.0$.

12. A monolithic ceramic capacitor comprising a plurality of dielectric ceramic layers laminated on one another, a pair of internal electrodes disposed to sandwich a dielectric ceramic layer, and a pair of external electrodes each of which is electrically connected to a different internal electrode, wherein the dielectric ceramic layers comprise the dielectric ceramic composition according to claim 11.

13. The monolithic ceramic capacitor according to claim 12, wherein the internal electrodes comprise Ni, Ni alloy, Cu or Cu alloy.

14. A monolithic ceramic capacitor comprising a plurality of dielectric ceramic layers laminated on one another, a pair of internal electrodes disposed to sandwich a dielectric ceramic layer, and a pair of external electrodes each of which is electrically connected to a different internal electrode, wherein the dielectric ceramic layers comprise the dielectric ceramic composition according to claim 7.

15. The monolithic ceramic capacitor according to claim 14, wherein the internal electrodes comprise Ni, Ni alloy, Cu or Cu alloy.

16. A monolithic ceramic capacitor comprising a plurality of dielectric ceramic layers laminated on one another, a pair of internal electrodes disposed to sandwich a dielectric ceramic layer, and a pair of external electrodes each of which is electrically connected to a different internal electrode, wherein the dielectric ceramic layers comprise the dielectric ceramic composition according to claim 2.

17. The monolithic ceramic capacitor according to claim 16, wherein the internal electrodes comprise Ni, Ni alloy, Cu or Cu alloy.

18. A monolithic ceramic capacitor comprising a plurality of dielectric ceramic layers laminated on one another, a pair of internal electrodes disposed to sandwich a dielectric ceramic layer, and a pair of external electrodes each of which is electrically connected to a different internal electrode, wherein the dielectric ceramic layers comprise the dielectric ceramic composition according to claim 1.

19. The monolithic ceramic capacitor according to claim 18, wherein the internal electrodes comprise Ni, Ni alloy, Cu or Cu alloy.

* * * * *